(12) United States Patent
Kothinti Naresh

(10) Patent No.: US 11,269,642 B2
(45) Date of Patent: Mar. 8, 2022

(54) DYNAMIC HAMMOCK BRANCH TRAINING FOR BRANCH HAMMOCK DETECTION IN AN INSTRUCTION STREAM EXECUTING IN A PROCESSOR

(71) Applicant: Microsoft Technology Licensing, LLC, Redmond, WA (US)

(72) Inventor: Vignyan Reddy Kothinti Naresh, Morrisville, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 159 days.

(21) Appl. No.: 16/577,264

(22) Filed: Sep. 20, 2019

(65) Prior Publication Data

US 2021/0089313 A1    Mar. 25, 2021

(51) Int. Cl.
*G06F 9/30* (2018.01)
*G06F 9/38* (2018.01)
*G06K 9/62* (2022.01)

(52) U.S. Cl.
CPC ........ *G06F 9/3806* (2013.01); *G06F 9/30058* (2013.01); *G06F 9/3812* (2013.01); *G06K 9/6256* (2013.01)

(58) Field of Classification Search
CPC ... G06F 9/30058; G06F 9/3806; G06F 9/3812
See application file for complete search history.

(56) References Cited

U.S. PATENT DOCUMENTS 5,093,778 A * 3/1992 Favor ............... G06F 9/3844
712/240
7,941,654 B2   5/2011 Luick
(Continued)

FOREIGN PATENT DOCUMENTS

EP   2674858 A2   12/2013
EP   3001308 A2    3/2016

OTHER PUBLICATIONS

Collins, et al., "Control Flow Optimization Via Dynamic Reconvergence Prediction", In Proceedings of 37th International Symposium on Microarchitecture, Dec. 4, 2004, 12 Pages.
(Continued)

*Primary Examiner* — William B Partridge
*Assistant Examiner* — Kasim Alli
(74) *Attorney, Agent, or Firm* — Withrow & Terranova, PLLC

(57) ABSTRACT

Dynamic hammock branch training for branch hammock detection in an instruction stream executing in a processor is disclosed. A branch hammock detection circuit is configured to dynamically detect branch hammocks in an instruction stream during run-time processing of the instruction stream. In response to an identified conditional branch instruction, the branch hammock detection circuit starts a training process for a potential branch hammock predicated by the conditional branch instruction. The branch hammock detection circuit is configured to determine if an identified in-training branch hammock is an actual branch hammock based on setting a potential convergence point as the target address for the conditional branch instruction based on whether the branch is taken or not taken. If an instruction is processed at the set convergence point, this means the set convergence point can be an actual convergence point and the in-training branch hammock can be detected as an actual branch hammock.

19 Claims, 14 Drawing Sheets

(56) References Cited

U.S. PATENT DOCUMENTS

| | | | |
|---|---|---|---|
| 10,209,992 B2 | 2/2019 | Wilson et al. | |
| 2005/0138480 A1* | 6/2005 | Srinivasan | G06F 9/3842 714/38.1 |
| 2005/0216714 A1* | 9/2005 | Grochowski | G06F 9/3848 712/240 |
| 2006/0230259 A1 | 10/2006 | Ahmed et al. | |
| 2010/0262813 A1 | 10/2010 | Brown et al. | |
| 2013/0151823 A1 | 6/2013 | Beaumont-smith, et al. | |
| 2019/0087193 A1 | 3/2019 | Brar et al. | |
| 2019/0163902 A1 | 5/2019 | Reid et al. | |
| 2021/0019149 A1* | 1/2021 | Chauhan | G06F 9/30145 |

OTHER PUBLICATIONS

Kim, et al., "Compiler-Assisted Dynamic Predicated Execution of Complex Control-Flow Structures", In Technical Report of High Performance Systems Group,Department of Electrical and Computer Engineering,The University of Texas at Austin,TR-HPS-2006-005, Apr. 2006, 26 Pages.

Kim, et al., "Profile-assisted Compiler Support for Dynamic Predication in Diverge-Merge Processors", In Proceedings of the International Symposium on Code Generation and Optimization, Mar. 11, 2007, 12 Pages.

Santos, et al., "Complex Branch Profiling for Dynamic Conditional Execution", In Proceedings of 15th Symposium on Computer Architecture and High Performance Computing, Nov. 10, 2003, 8 Pages.

Yeh, et al., "Two-Level Adaptive Training Branch Prediction", In Proceedings of the 24th annual international symposium on Microarchitecture, Nov. 18, 1991, pp. 51-61.

"International Search Report and Written Opinion Issued in PCT Application No. PCT/US2020/038852", dated Nov. 9, 2020, 10 Pages.

* cited by examiner

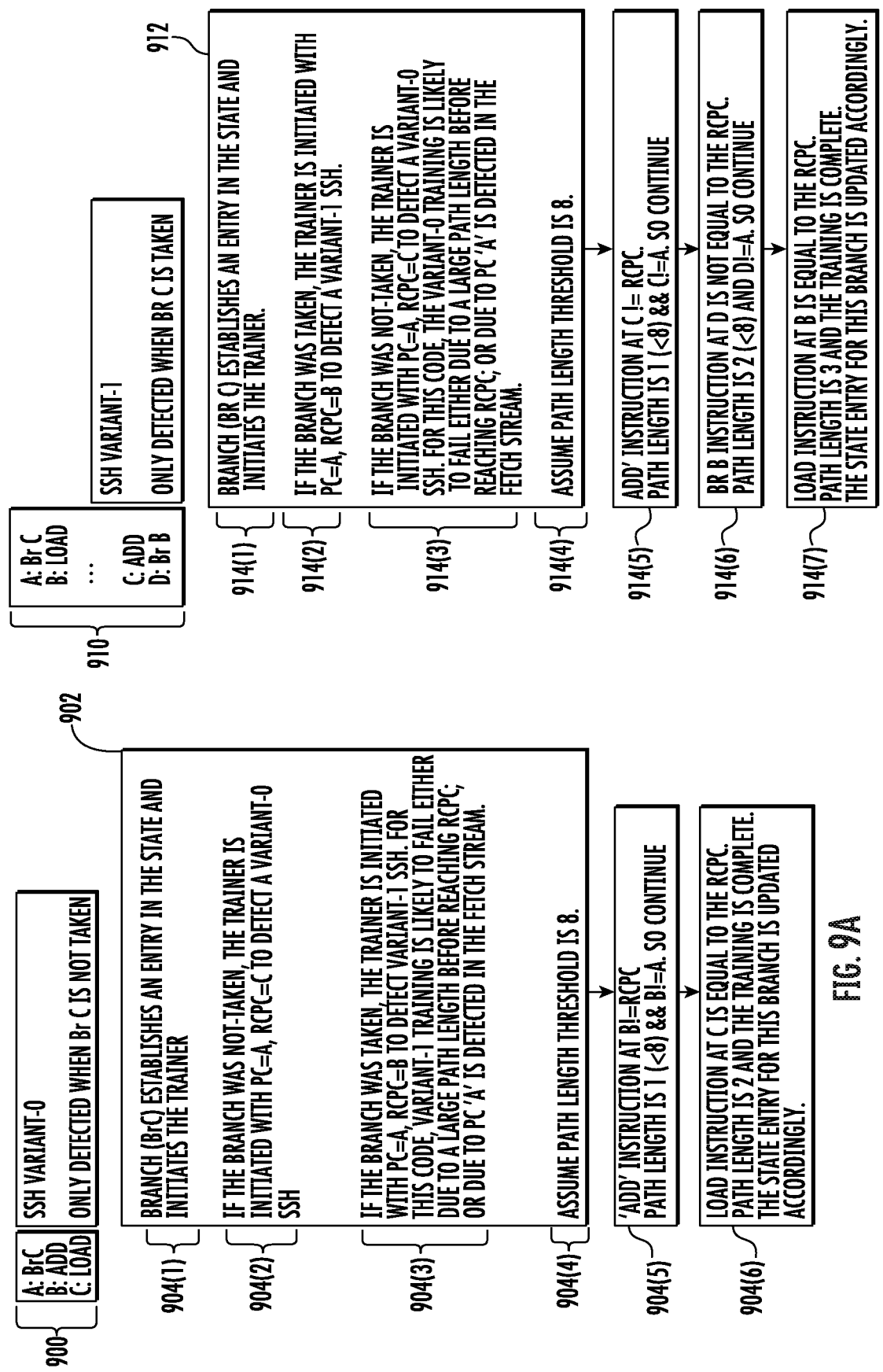

DYNAMIC HAMMOCK BRANCH TRAINING FOR BRANCH HAMMOCK DETECTION IN AN INSTRUCTION STREAM EXECUTING IN A PROCESSOR

FIELD OF THE DISCLOSURE

The technology of the disclosure relates to processor-based systems employing a central processing unit (CPU), also known as a "processor," and more particularly to an instruction processing circuit in a processor processing computer software instructions that can include branch instructions.

BACKGROUND

A central processing unit (CPU), also known as a "processor," performs computational tasks for a wide variety of applications. A conventional processor includes one or more processor cores, also known as "CPU cores." A processor executes computer program instructions ("instructions"), also known as "software instructions," that are fetched from an instruction memory. The processor executes the fetched instructions from memory into an instruction stream that is processed by an instruction processing circuit to perform operations based on an instruction type and data operands and generates a result. For example, the instruction stream of fetched instructions from an instruction program may be pipelined in an instruction pipeline(s) in the processor whereby the throughput of computer instructions being executed by the processor may be increased by splitting the handling of each instruction into a series of steps.

Computer instructions include branch instructions. A branch instruction is an instruction that can cause a computer to begin processing a different instruction sequence at a branch target address different from the next instruction following the branch instruction, and thus deviate from its default behavior of processing instructions in order. For example, a branch instruction can be an immediate branch instruction that branches to a branch target address in the instruction stream not based on any condition. Thus, the branch is always "Taken" for an immediate branch instruction. A conditional branch instruction is a branch instruction that only branches to a branch target address in the instruction stream to continue processing of instructions only if a certain condition contained in the conditional branch instruction is true. If the condition is true, this is known as "branch Taken," and the instruction processing circuit jumps to the branch target address in the instruction stream to continue executing instructions. If the condition is false, this is known as "branch not Taken," and the instruction processing circuit falls through to the next instruction following the conditional branch instruction in the instruction stream for execution.

A conditional branch instruction can cause a branch hammock to exist in an instruction program. A branch hammock is a short forward branch that spans some instructions in the instruction stream in the form of an if-then or if-then-else construct. A branch hammock can be a single-sided hammock (SSH) or a double-sided hammock (DSH). FIG. 1A is a graph representation of a branch SSH 100, which is one variant of a branch DSH. A conditional branch instruction 102 controls whether a branch is taken or not taken. A branch occurs to a branch target 104 in a branch taken path 106 if the condition of the conditional branch instruction 102 is determined to be true. A branch does not occur if the condition of the conditional branch instruction 102 is determined to be false, thus falling through to a branch fall-through in a branch not taken path 108 to an instruction 110 directly following the conditional branch instruction 102. The branch taken path 106 jumps over the instructions in the branch not taken path 108. The branch taken path 106 and branch not taken path 108 converge back at a branch convergence point 112. FIG. 1B illustrates graphs of two (2) other variants of the branch SSH 100 in FIG. 1A. Variant branch SSH 114 in FIG. 1B has a branch 116 in the branch taken path 118 that immediately branches to a branch convergence point 120 in the branch not taken path 122. Variant branch SSH 124 has immediate branches 126, 128 to branch targets 130, 132 in a branch not taken path 134 that will eventually converge with the branch taken path 136 at a branch convergence point 138.

FIG. 2A is a graph representation of a branch DSH 200, which is one variant of a branch DSH. A conditional branch instruction 202 controls whether a branch is taken or not taken. A branch occurs to a branch target 204 in a branch taken path 206 if the condition of the conditional branch instruction 202 is determined to be true. A branch does not occur if the condition of the conditional branch instruction 202 is determined to be false, thus falling through to a branch fall-through 208 in a branch not taken path 210 to an instruction 212 directly following the conditional branch instruction 202. The branch not taken path 210 includes a branch 214 to a branch reconvergence point 216 of the branch taken path 206 and branch not taken path 210. FIG. 2B illustrates graphs of three (3) other variants of the branch DSH 200 in FIG. 2A. Variant branch DSH 218 in FIG. 2B has a branch not taken path 220 that has a branch 222 jumping over a branch taken path 224 to a branch convergence point 226. Variant branch DSH 228 in FIG. 2B has a branch taken path 230 that has a branch 232 jumping to a branch convergence point 234 in the branch not taken path 236. Variant branch DSH 238 in FIG. 2B has a branch not taken path 240 that has a branch 242 and a second branch 244 jumping to a branch convergence point 246 in the branch taken path 248.

Identifying dynamic characteristics of a branch hammock can be used to improve processor efficiency. However, the branch hammock has to be identified in an instruction stream to be able to identify characteristics of the branch hammock. As discussed above in FIGS. 1A-2B, SSH and DSH branches can be implemented in variants having different branch targets and branch paths that are not known to the processor ahead of time.

SUMMARY

Aspects disclosed herein include dynamic hammock branch training for branch hammock detection in an instruction stream executing in a processor. The processor is configured to execute computer software instructions to perform operations. The processor includes an instruction processing circuit that may include a number of instruction processing stages configured to pipeline the processing and execution of instructions in an instruction stream fetched from an instruction program according to a dataflow execution. Hammock branches may be present in the instruction program predicated by conditional branch instructions being present in the instruction program. Run-time processor efficiency may be improved by identifying characteristics of hammock branches in the run-time dataflow execution of an instruction stream.

In this regard, the instruction processing circuit includes a branch hammock detection circuit that is configured to dynamically detect branch hammocks in an instruction stream during run-time processing of the instruction stream. In examples, the branch hammock detection circuit is configured to receive an indication of a conditional branch instruction (e.g., a program counter (PC) of the conditional branch instruction) being present in the instruction stream being processed in the instruction processing circuit. In response to a conditional branch instruction being identified, the branch hammock detection circuit starts a training process for a potential branch hammock predicated by the conditional branch instruction to determine whether an actual branch hammock is present. The branch hammock detection circuit is configured to determine if an identified in-training branch hammock is an actual branch hammock based on capturing a branch address for the conditional branch instruction based on whether a branch is taken or not taken by the instruction processing circuit for the conditional branch instruction. The target address is used to set a potential convergence point for the in-training branch hammock. If the branch hammock detection circuit determines that an instruction in the instruction stream at the set convergence point is processed (i.e., reached), this means the set convergence point was determined to be an actual convergence point. In response, the in-training branch hammock is detected as an actual branch hammock. The branch hammock detection circuit can also be configured to track information about the instructions processed during the training process of an in-training branch hammock. In this manner, this tracked information can be reused to optimize processing when the in-training branch hammock is confirmed to be an actual branch hammock. This tracked information may be useful to the instruction processing circuit when the same conditional branch instruction for the confirmed actual branch hammock is again encountered in an instruction stream.

Examples disclosed herein include the branch hammock detection circuit being capable of detecting a branch single-sided hammock (SSH) and/or a branch double-sided hammock (DSH). In a branch SSH, the convergence point is either the branch target address of the conditional branch instruction as a first variant (e.g., variant-0) branch SSH, or the branch fall-through address of the next instruction after the conditional branch instruction as a second variant (e.g., variant-1) branch SSH. Thus, to detect a branch SSH, only the branch not taken path for a variant-0 branch SSH or the taken path for a variant-1 branch SSH needs to be processed in training for an in-training branch SSH to be detected an actual branch SSH. When the branch is not taken for an in-training branch SSH, the target address used to set a potential convergence address can be the branch target address from the conditional branch instruction under the assumption that the branch hammock is a first variant or "variant-0" branch hammock. This is because for a not taken branch for a variant-0 branch hammock, the not taken instruction flow path is processed first before reaching the branch target address. However, when a branch of the conditional branch instruction is taken, the target address used to set the potential convergence address can be the branch fall-through address from the conditional branch instruction under the assumption that the branch hammock is a second variant or "variant-1" branch hammock. This is because for a taken branch for a variant-1 branch hammock, the taken instruction flow path is processed first before reaching the branch fall-through address. In either case, as a non-limiting example, if the instruction at the set potential convergence address is reached before a return instruction or another branch instruction is processed, this means the set potential convergence address is an actual convergence point for the conditional branch instruction, and thus the in-training branch SSH is detected as an actual branch SSH. If the assumption of the in-training branch SSH was a second variant (variant-1) branch SSH, the detected actual branch SSH will be detected as a second variant (variant-1) branch SSH. If the assumption of the in-training branch SSH was a first variant (variant-0) branch SSH, the detected actual branch SSH will be detected as a first variant (variant-0) branch SSH. If the return instruction or another branch instruction is processed before the instruction set potential convergence address is reached, the training fails and the in-training branch SSH is not identified as a branch SSH. Note that if the in-training branch SSH fails, this does not necessarily mean the in-training branch SSH is not an actual branch SSH; it just means that not enough information was available to confirm the in-training branch SSH as an actual branch SSH.

In a branch DSH, as opposed to a branch SSH, both the taken path and the branch not taken path contain instructions to be processed before reaching a convergence point. Thus, in examples disclosed herein, an in-training branch DSH is trained based on either a branch taken path and branch not taken path of a conditional branch instruction being processed to determine if an in-training branch DSH can be detected as an actual branch DSH. As a non-limiting example, training of an in-training branch DSH may be performed if the SSH training for an in-training branch hammock failed. In this regard, the branch hammock detection circuit is configured to perform a training process for either a branch taken or branch not taken path from a conditional branch instruction of an in-training branch DSH. Branch targets of branch instructions are recorded as potential convergence addresses as instructions in the instruction flow path following the conditional branch instruction are processed as part of training. In one example, once the current instruction (e.g., program counter (PC)) address in the instruction flow path matches the address of the conditional branch instruction, or the path length of instructions processed after the conditional branch instruction exceeds a defined threshold, or the number of branch targets captured exceeds a defined threshold, a branch hammock training confirmation process is performed for subsequent instructions processed in the instruction flow path. In the branch hammock training confirmation process, the branch targets of branch instructions are recorded as potential convergence addresses as instructions are processed in the instruction flow path. If the current instruction processed in the instruction flow path is in the recorded list of branch target addresses as set potential convergence addresses, this means there was convergence in the instruction flow path and training is deemed to have passed. In response, the in-training branch DSH is detected as an actual branch DSH. However, if subsequent instructions in the instruction flow path processed during the branch hammock training confirmation process do not have an address of a recorded target address as a set potential convergence address before either the current instruction address matches the conditional branch instruction address, or the path length of instructions processed after the conditional branch instruction exceeds a defined threshold, or the number of branch targets captured exceeds a defined threshold, this means a convergence could not be confirmed for the in-training branch DSH. In this case, training of the in-training branch DSH is deemed to have failed, and the in-training branch DSH is not detected as an actual branch DSH. Note that if the in-training branch DSH fails, this does not necessarily mean the in-training branch DSH is not an actual branch DSH; it just means that not enough information was available to confirm the in-training branch DSH as an actual branch DSH.

Note that a branch hammock detection circuit can be configured to initiate training for both a branch SSH and a branch DSH in response to a conditional branch instruction. The training process for both an in-training branch SSH and an in-training branch DSH can be performed to determine if the conditional branch instruction is part of an actual branch SSH or actual branch DSH.

In this regard, in one exemplary aspect, a branch hammock detection circuit for detecting branch hammocks is provided. The branch hammock detection circuit is configured to receive a conditional branch instruction record in an instruction stream being processed in a processor, the conditional branch instruction record comprising an instruction identifier of a conditional branch instruction in the instruction stream and a branch target address in the instruction stream for the conditional branch instruction. The branch hammock detection circuit is also configured to set a potential convergence address for an in-training branch hammock in the instruction stream predicated by the conditional branch instruction to a branch target address in the instruction stream, in response to a taken indicator indicating a not Taken state. The branch hammock detection circuit is also configured to receive an address of one or more instructions in the instruction stream processed by the processor following the conditional branch instruction in the instruction stream. The branch hammock detection circuit is also configured to determine if the address of the one or more processed instructions following the conditional branch instruction is the potential convergence address for the in-training branch hammock. In response to the address of an instruction of the one or more processed instructions following the conditional branch instruction being the potential convergence address for the in-training branch hammock, the branch hammock detection circuit is also configured to generate a branch hammock indicator indicating the in-training branch hammock is an actual branch hammock corresponding to the conditional branch instruction.

In another exemplary aspect, a method of detecting a branch hammock predicated by a conditional branch instruction in an instruction stream executing in a processor is provided. The method comprises receiving a conditional branch instruction record in an instruction stream being processed in a processor, the conditional branch instruction record comprising an instruction identifier of a conditional branch instruction in the instruction stream and a branch target address in the instruction stream for the conditional branch instruction. The method also comprises setting a potential convergence address for an in-training branch hammock in the instruction stream predicated by the conditional branch instruction to a branch target address in the instruction stream, in response to the taken indicator indicating a not Taken state. The method also comprises receiving an address of one or more instructions in the instruction stream processed by the processor following the conditional branch instruction in the instruction stream. The method also comprises determining if the address of the one or more processed instructions following the conditional branch instruction is the potential convergence address for the in-training branch hammock. The method also comprises generating a branch hammock indicator indicating the in-training branch hammock is an actual branch hammock corresponding to the conditional branch instruction, in response to the address of an instruction of the one or more processed instructions following the conditional branch instruction being the potential convergence address for the in-training branch hammock.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 4A:
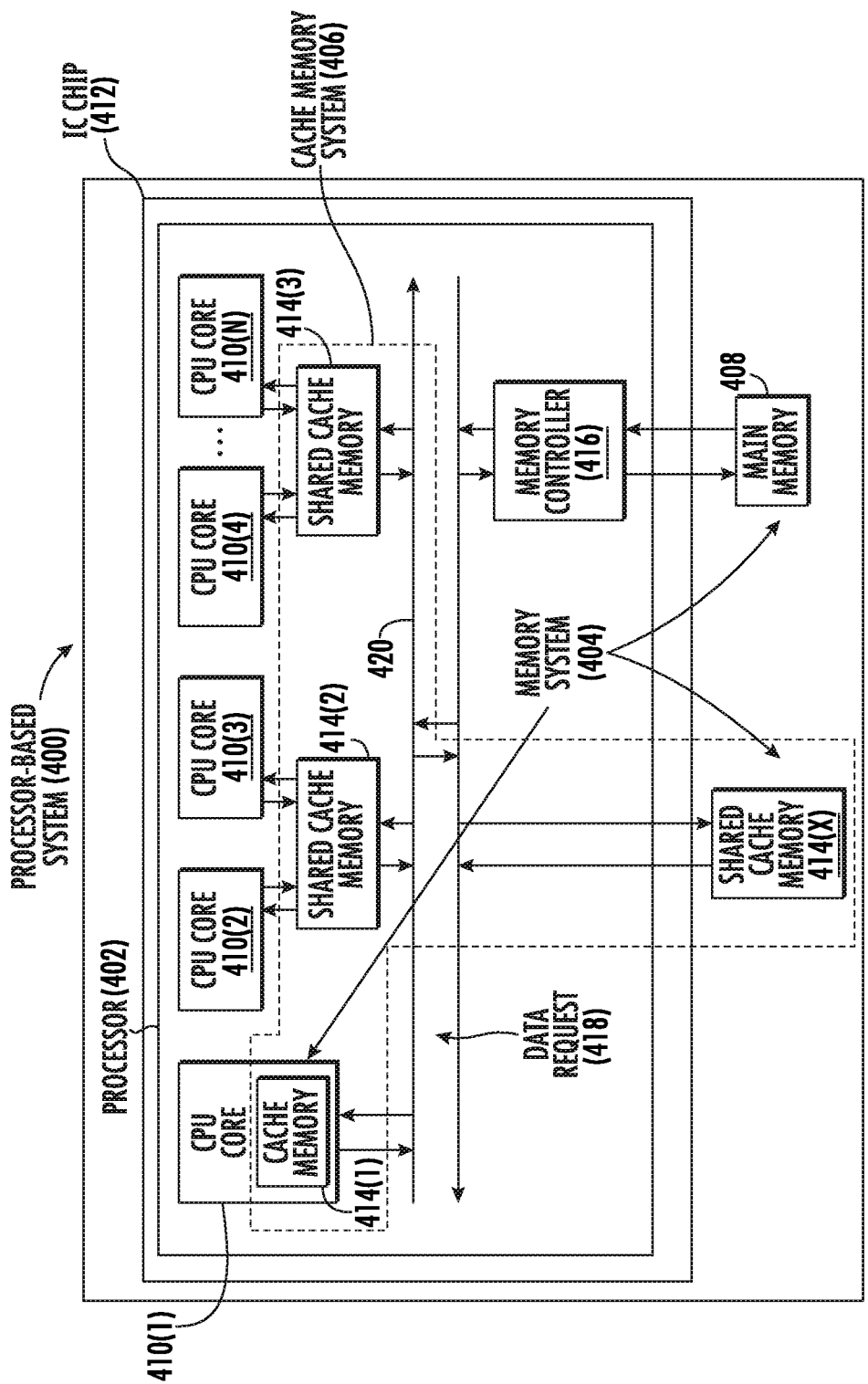
FIG. 4A is a diagram of an exemplary processor-based system that includes a processor with multiple central processing unit (CPU) cores each configured to process instructions fetched from memory.
Figure 4B:
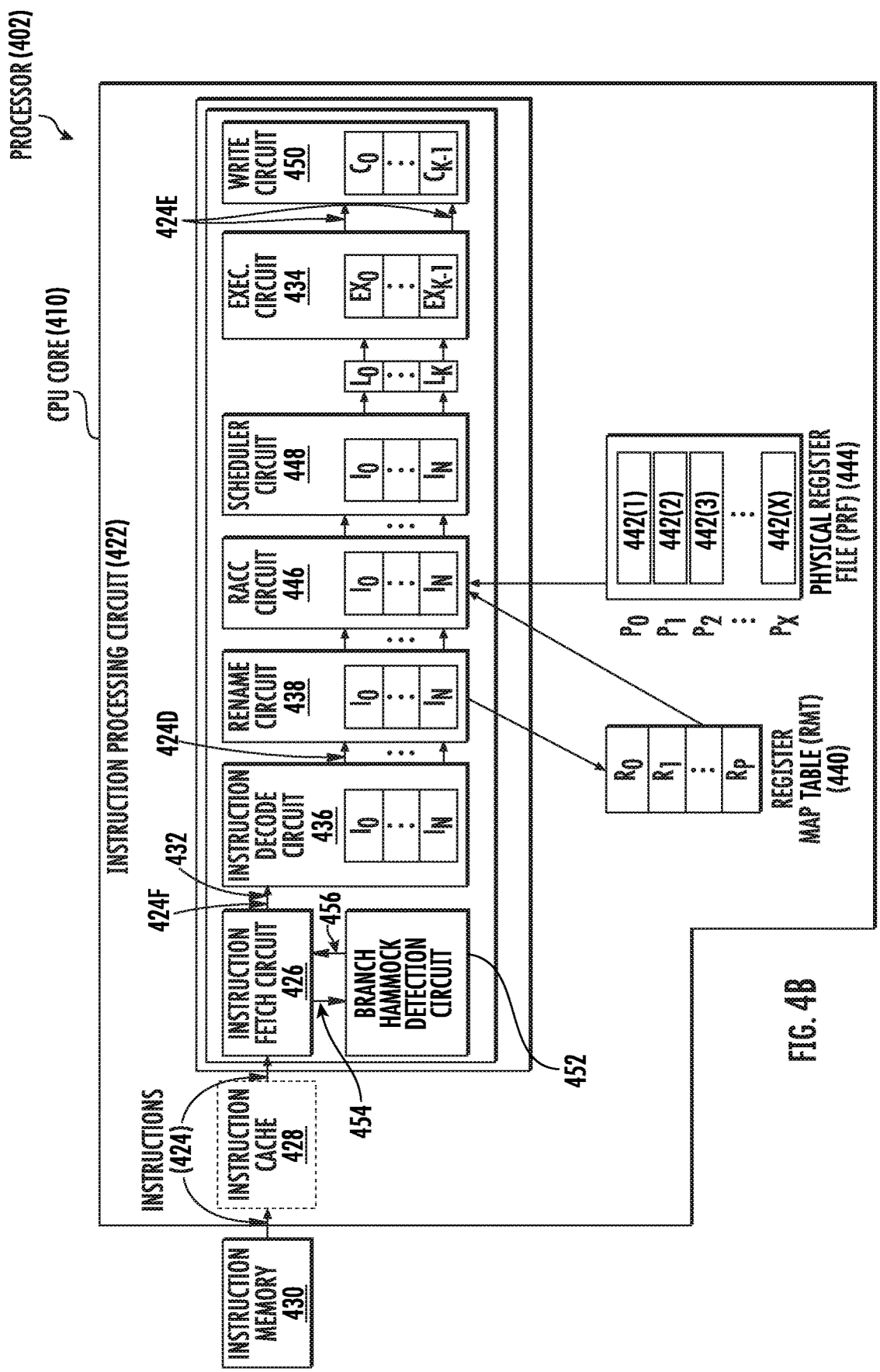
FIG. 4B is a diagram of an exemplary instruction processing circuit that can be included in the processor in FIG. 4A and that includes one or more instruction pipelines for processing computer instructions for execution, wherein the instruction processing circuit includes a branch hammock detection circuit configured to dynamically detect a branch hammock in an instruction stream being processed.
Figure 5A:
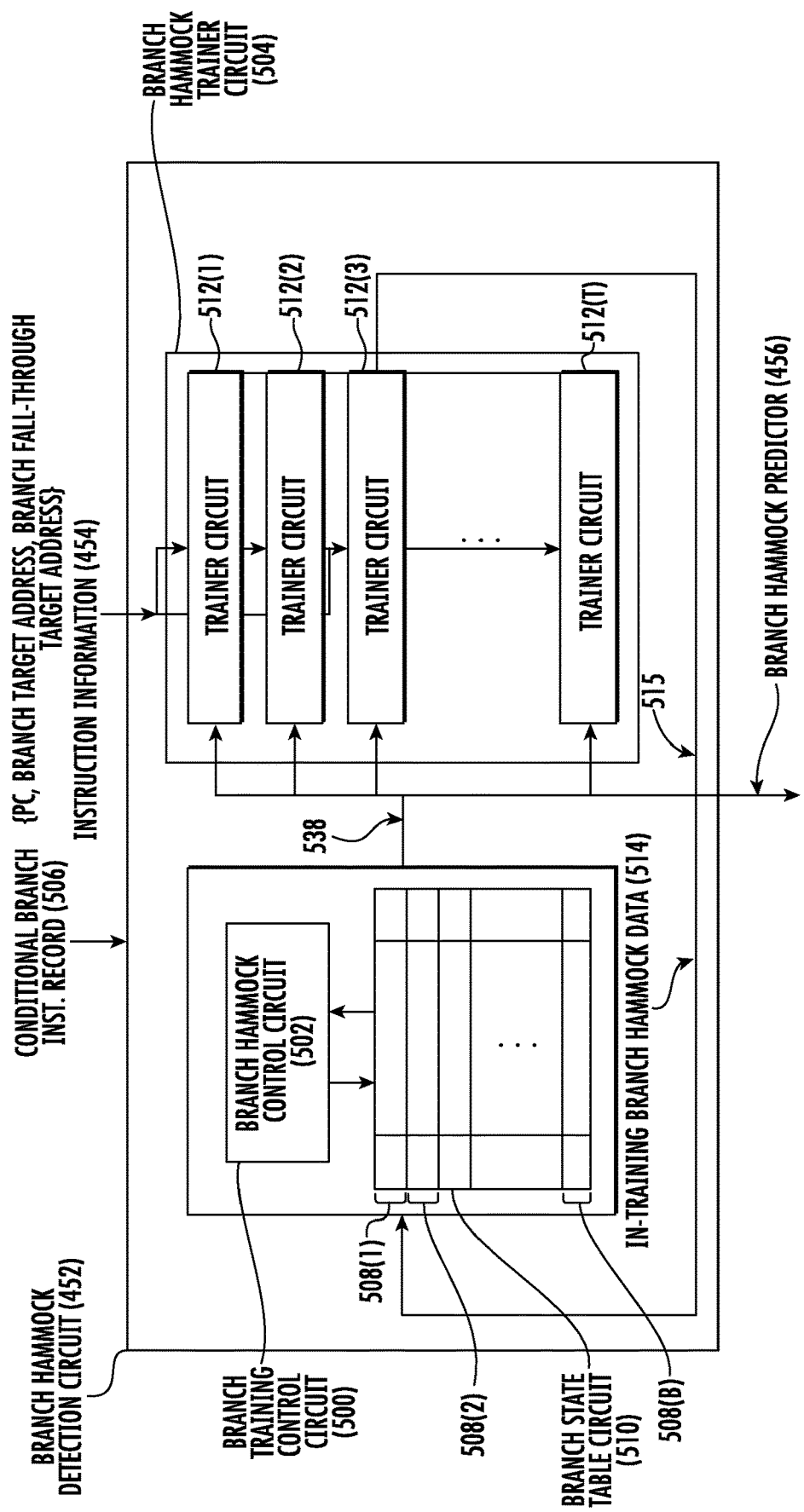
Figure 5B:
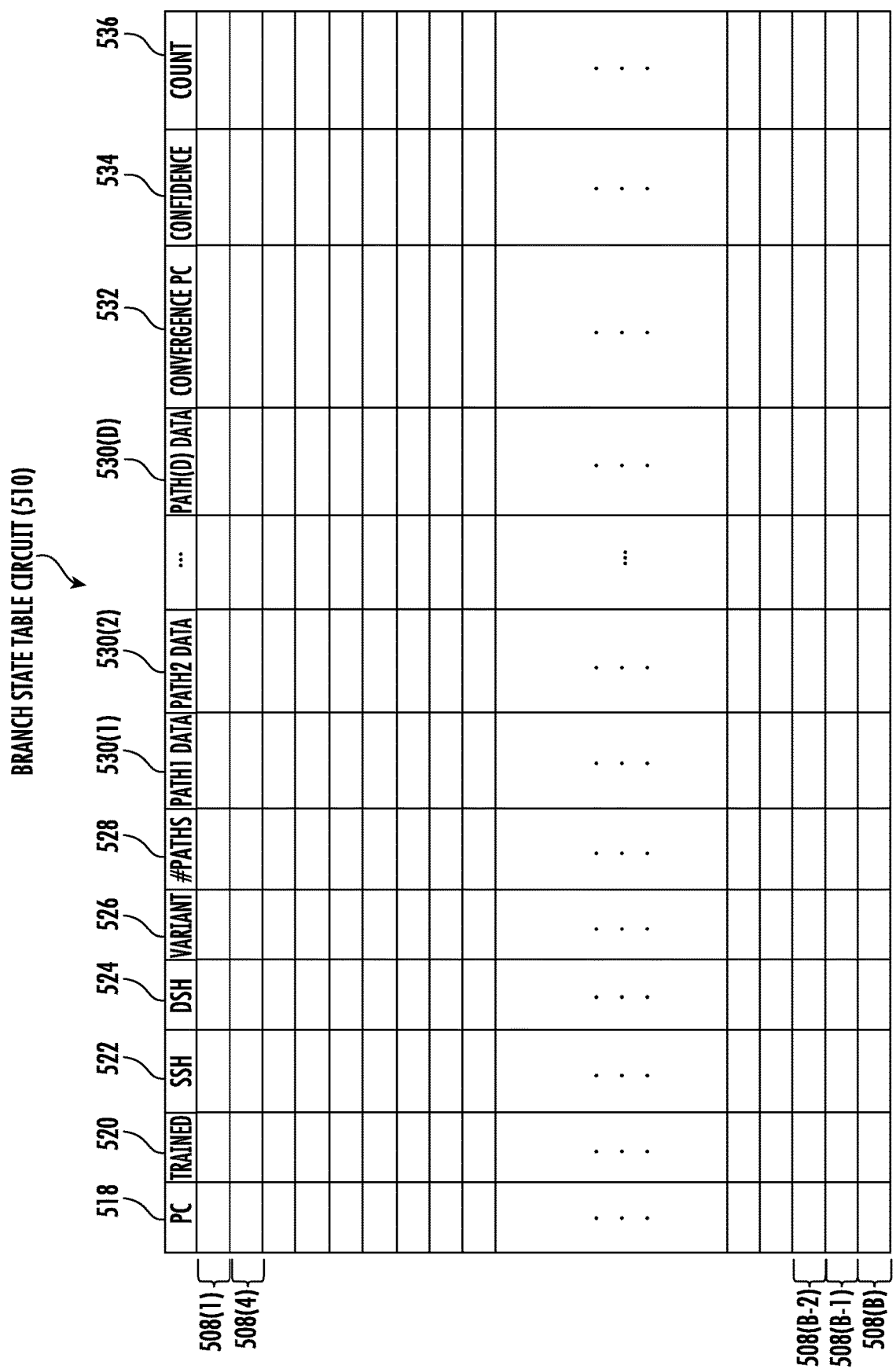
Figure 6:
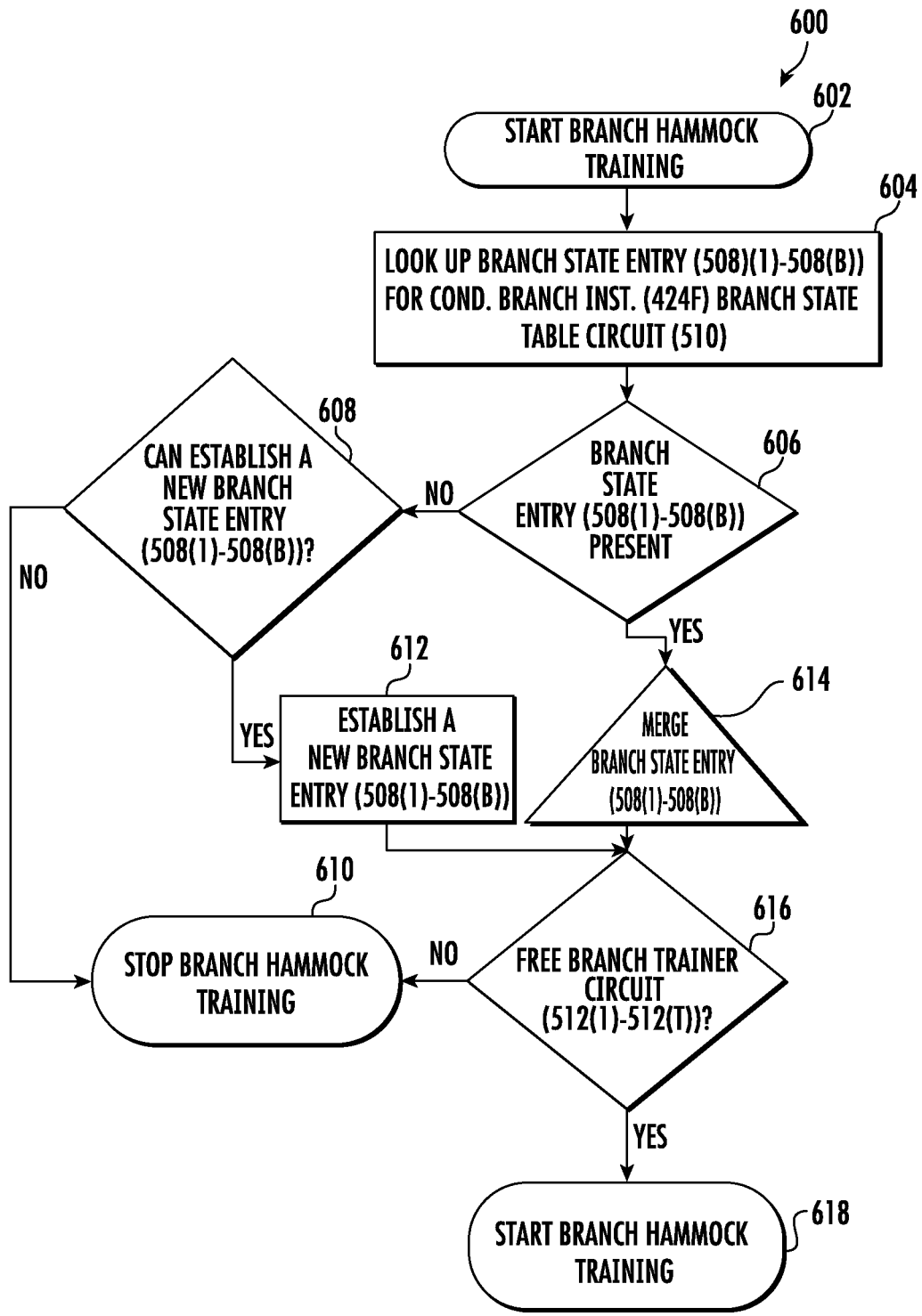
Figure 7:
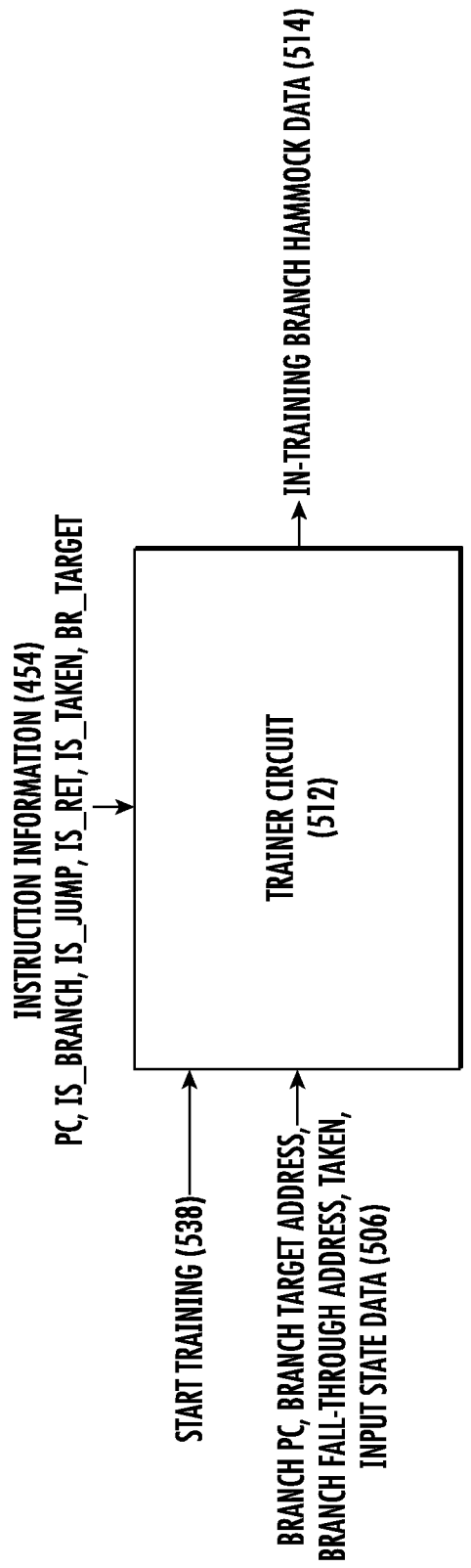
Figure 8:
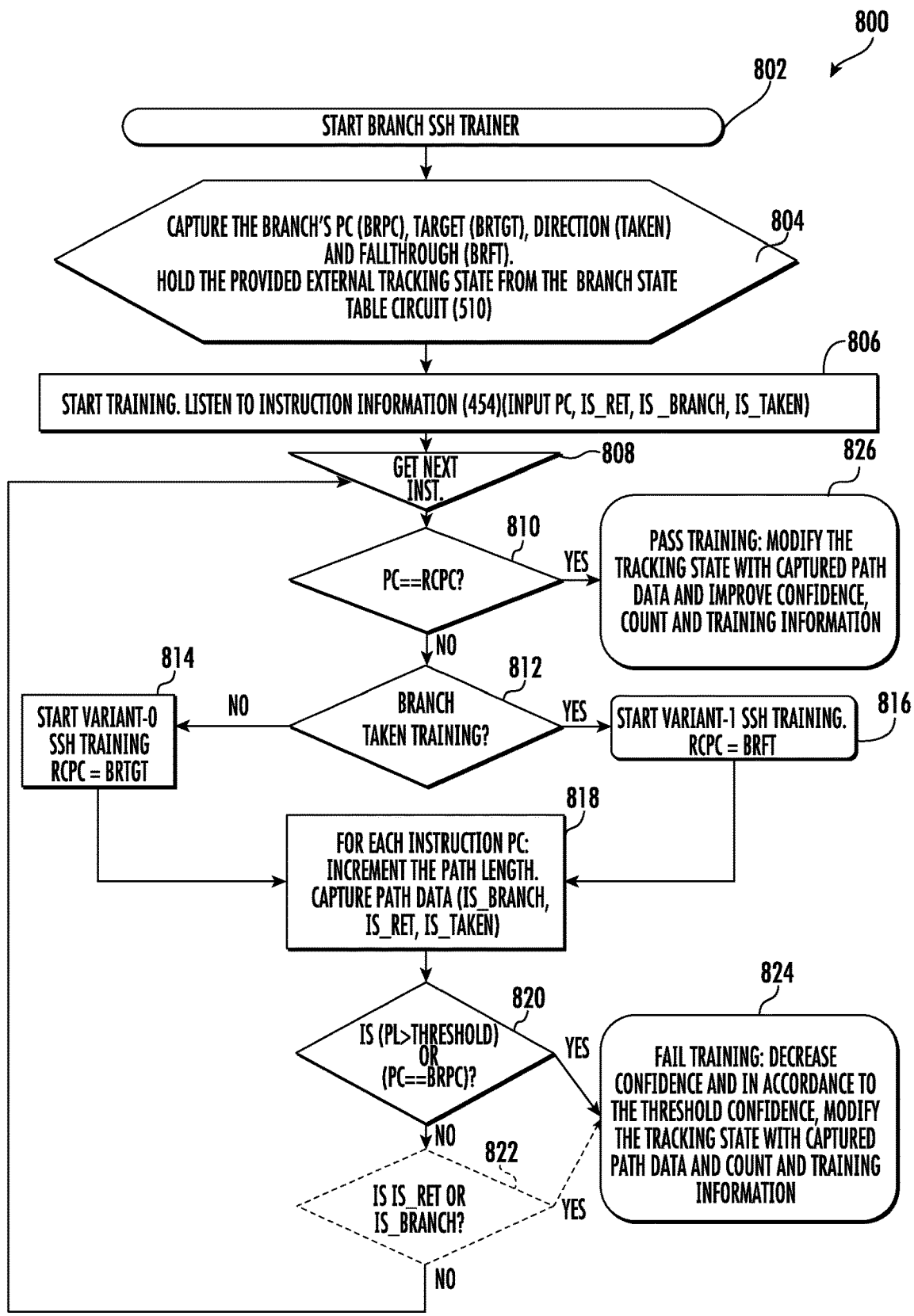
Figure 10A:
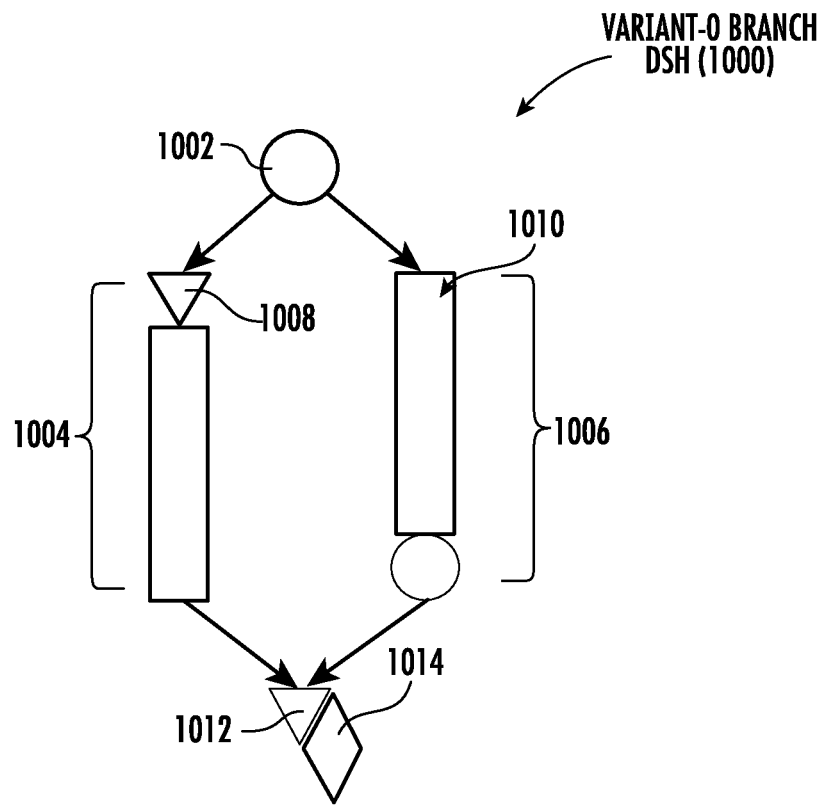
Figure 10B:
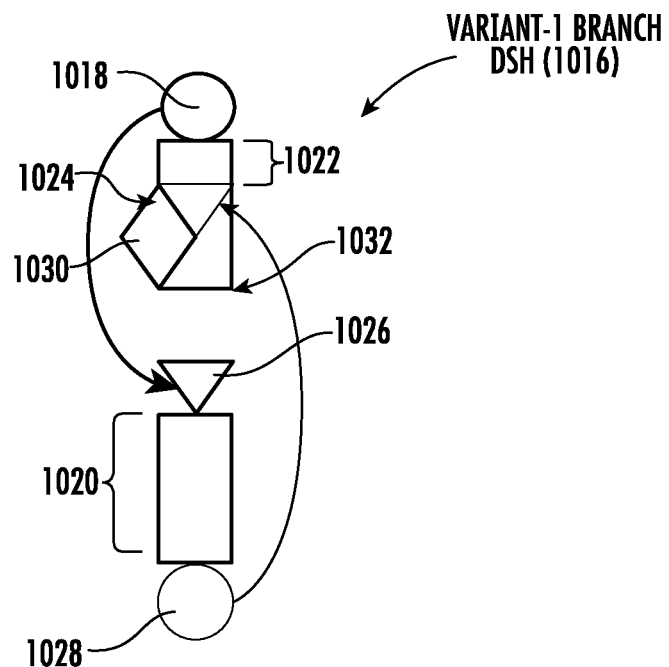
Figure 11:
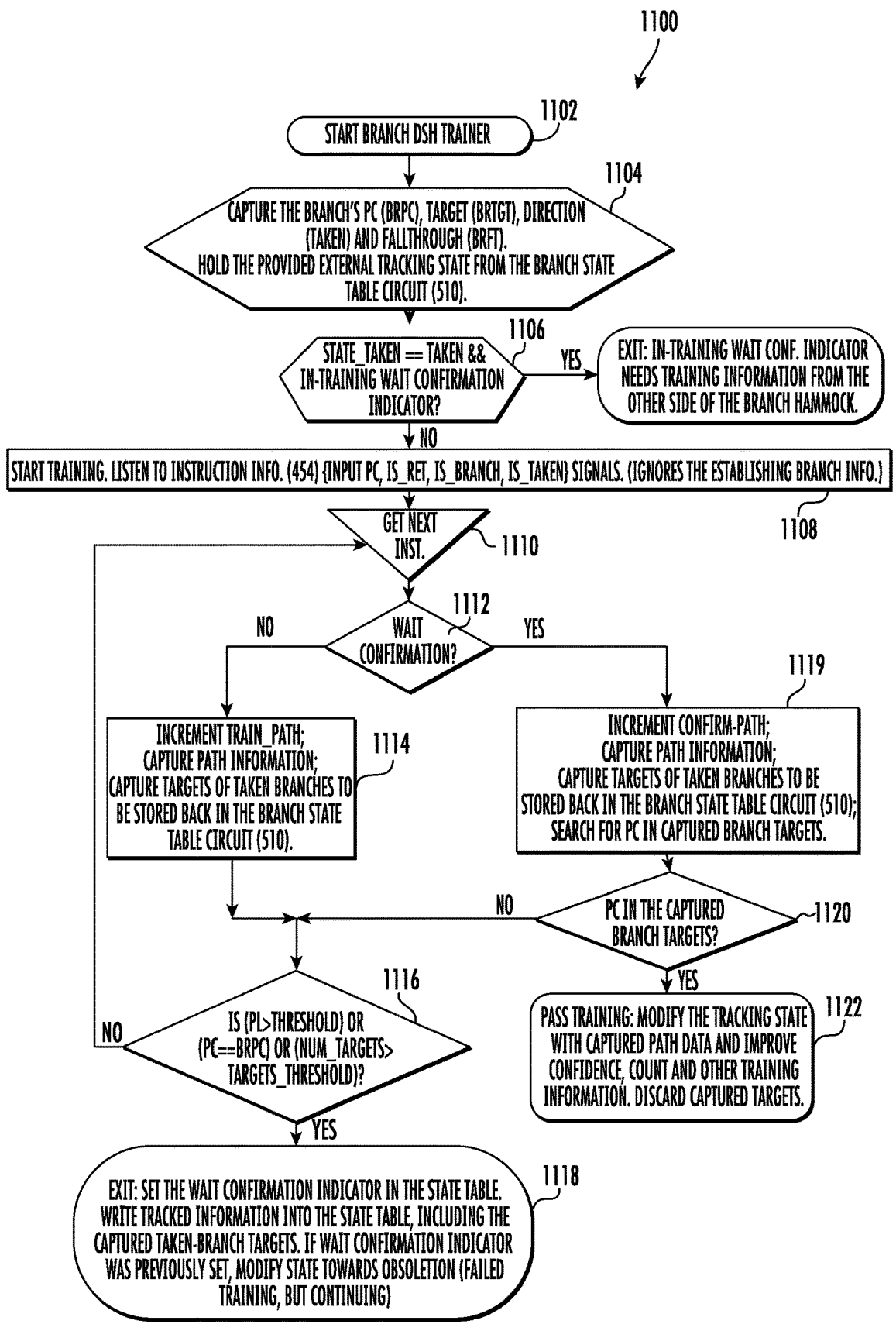
Figure 12:
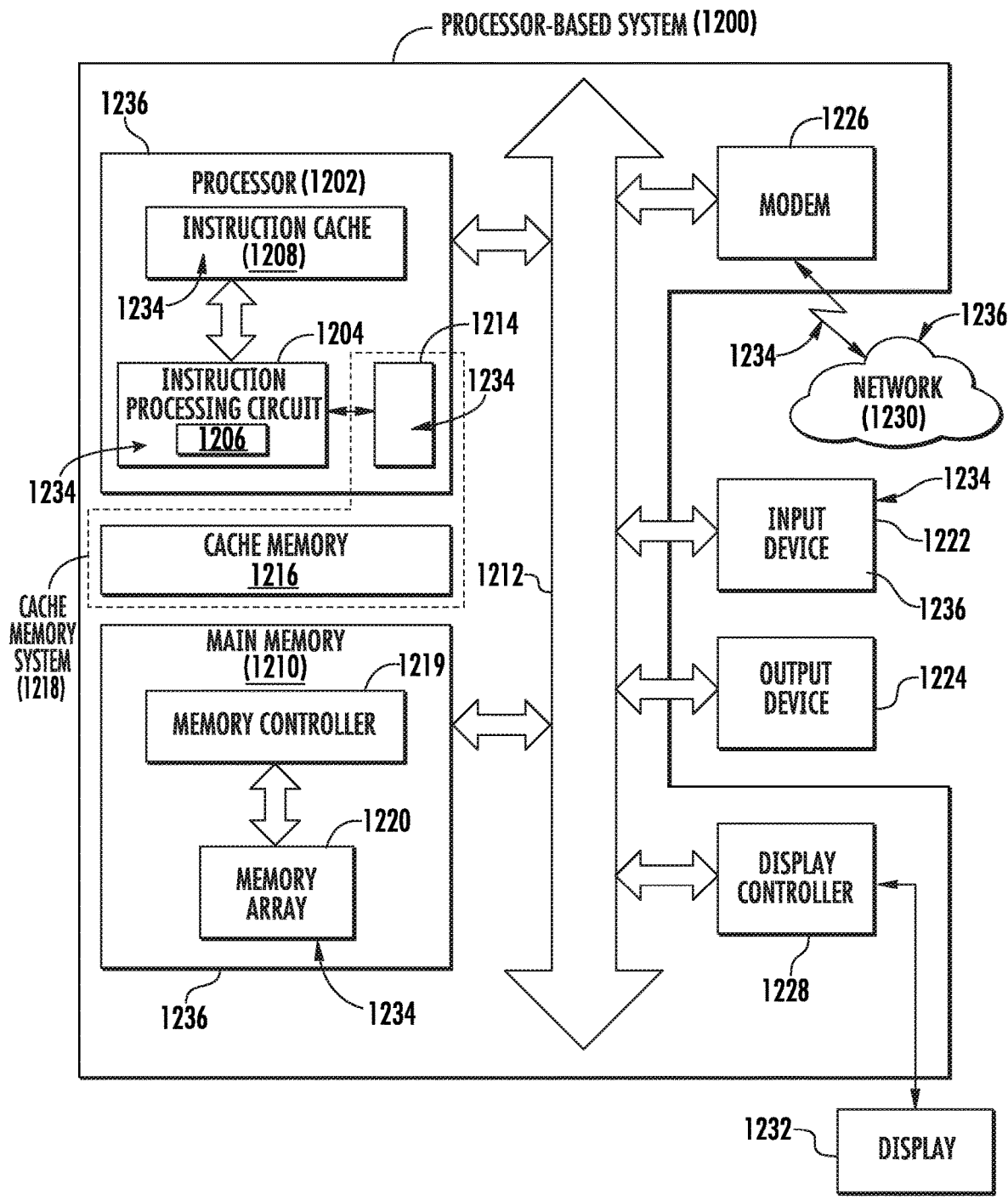

FIG. 5A is a diagram of an exemplary branch hammock detection circuit that can be included in the instruction processing circuit in the processor in FIG. 4B, wherein the branch hammock detection circuit includes a branch state table comprising a plurality of branch state entries for tracking information of identified in-training and actual branch hammocks in a processed instruction stream, and branch hammock trainer circuits configured to dynamically detect whether an in-training branch hammock is an actual branch hammock based on information received from the processed instructions in the instruction stream;

FIG. 5B is an exemplary branch state table circuit that can be provided in or accessed by the branch hammock detection circuit in FIG. 5A tracking information of identified in-training and actual branch hammocks in a processed instruction stream;

FIG. 6 is a flowchart illustrating an exemplary process of the branch hammock detection circuit in FIGS. 4B and 5A for receiving information about a conditional branch instruction processed in an instruction stream and establishing an in-training branch hammock to be trained by a branch hammock trainer circuit;

FIG. 7 is a diagram of another exemplary branch hammock trainer circuit in the branch hammock detection circuit in FIG. 5A;

FIG. 8 is a flowchart illustrating an exemplary process of a branch hammock trainer circuit conducting a dynamic training process for an identified in-training branch SSH to determine if the in-training branch SSH is an actual branch SSH;

FIG. 9A is an example of an instruction stream that includes a first variant branch SSH that can be detected by the branch hammock detection circuit in FIGS. 4B and 5A;

FIG. 9B is an example of an instruction stream that includes a second variant branch SSH that can be detected by the branch hammock detection circuit in FIGS. 4B and 5A;

FIG. 10A is a graph of a first variant branch DSH to illustrate both the branch taken path and the branch not taken path from a conditional branch instruction containing instructions before reaching a convergence point, to illustrate a theory of detecting a first variant branch DSH;

FIG. 10B is a graph of a second variant branch DSH to illustrate both the branch taken path and the branch not taken path from a conditional branch instruction containing instructions before reaching a convergence point, to illustrate a theory of detecting a second variant branch DSH;

FIG. 11 is a flowchart illustrating an exemplary process of a branch hammock trainer circuit conducting a dynamic training process for an identified in-training branch DSH to determine if the in-training branch DSH if an actual branch SSH; and FIG. 12 is a block diagram of an exemplary processor-based system that includes a processor that includes a branch hammock detection circuit configured to dynamically detect a branch hammock in an instruction stream being processed in the processor, including but not limited to the branch hammock detection circuit in FIGS. 4B and 5A.

DETAILED DESCRIPTION

Aspects disclosed herein include dynamic hammock branch training for branch hammock detection in an instruction stream executing in a processor. The processor is configured to execute computer software instructions to perform operations. The processor includes an instruction processing circuit that may include a number of instruction processing stages configured to pipeline the processing and execution of instructions in an instruction stream fetched from an instruction program according to a dataflow execution. Hammock branches may be present in the instruction program predicated by conditional branch instructions being present in the instruction program. Run-time processor efficiency may be improved by identifying characteristics of hammock branches in the run-time dataflow execution of an instruction stream.

Figure 1A:
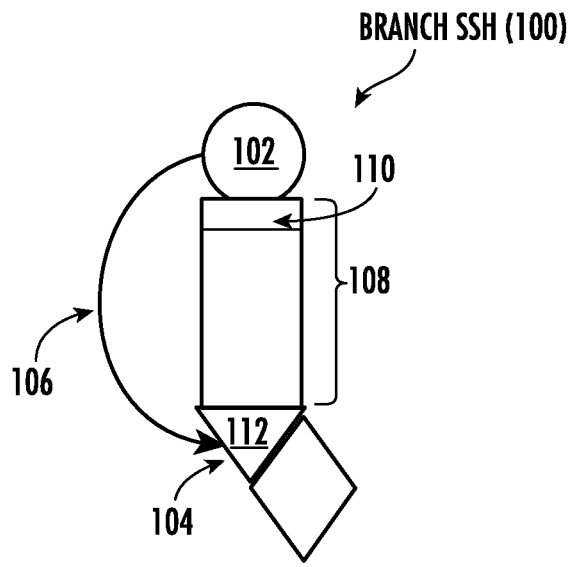
FIG. 1A is a graph of a single-sided hammock (SSH) branch.
Figure 1B:
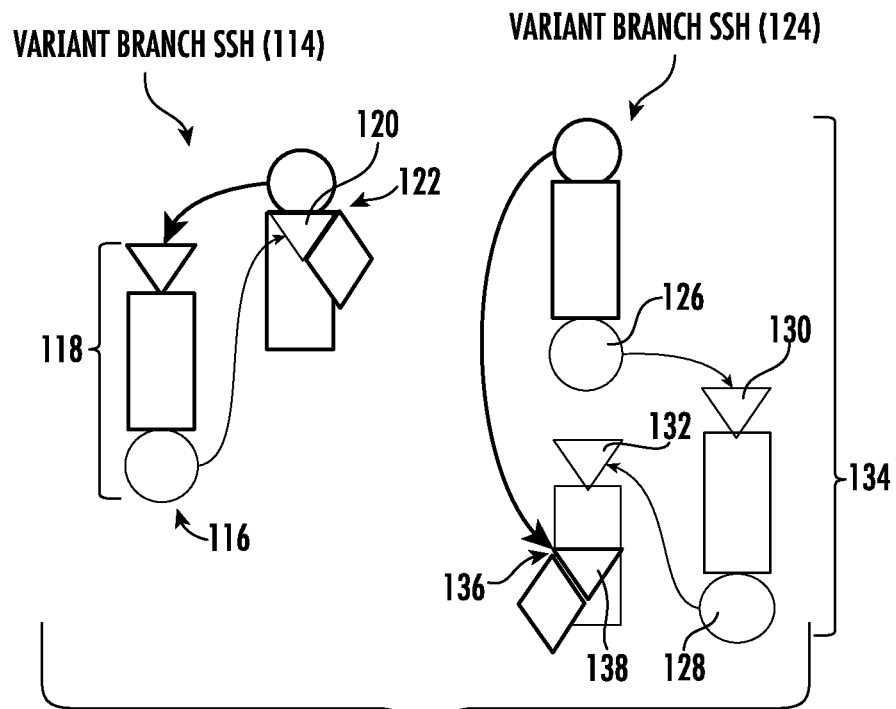
FIG. 1B is a graph of branch SSH variants.
Figure 2A:
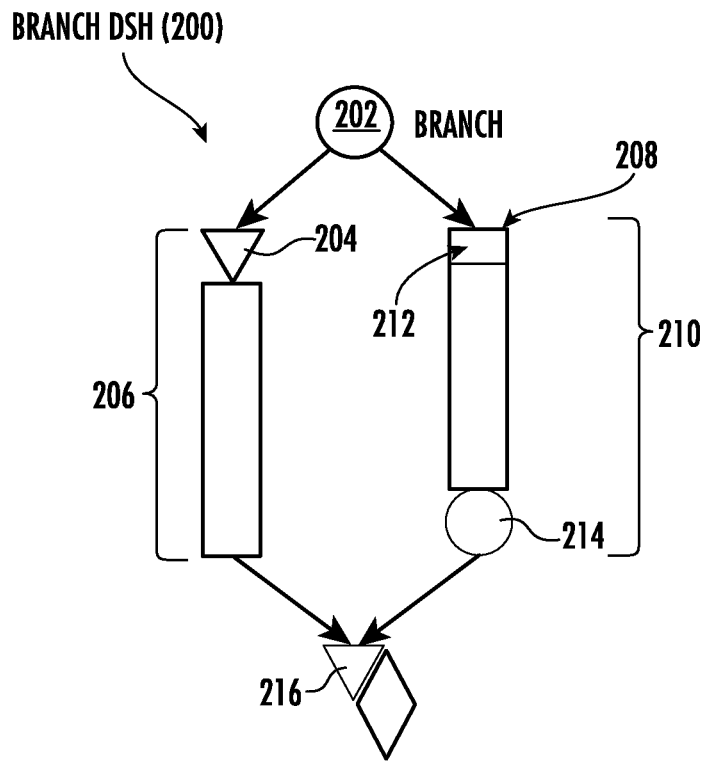
FIG. 2A is a graph of a double-sided hammock (DSH) branch.
Figure 2B:
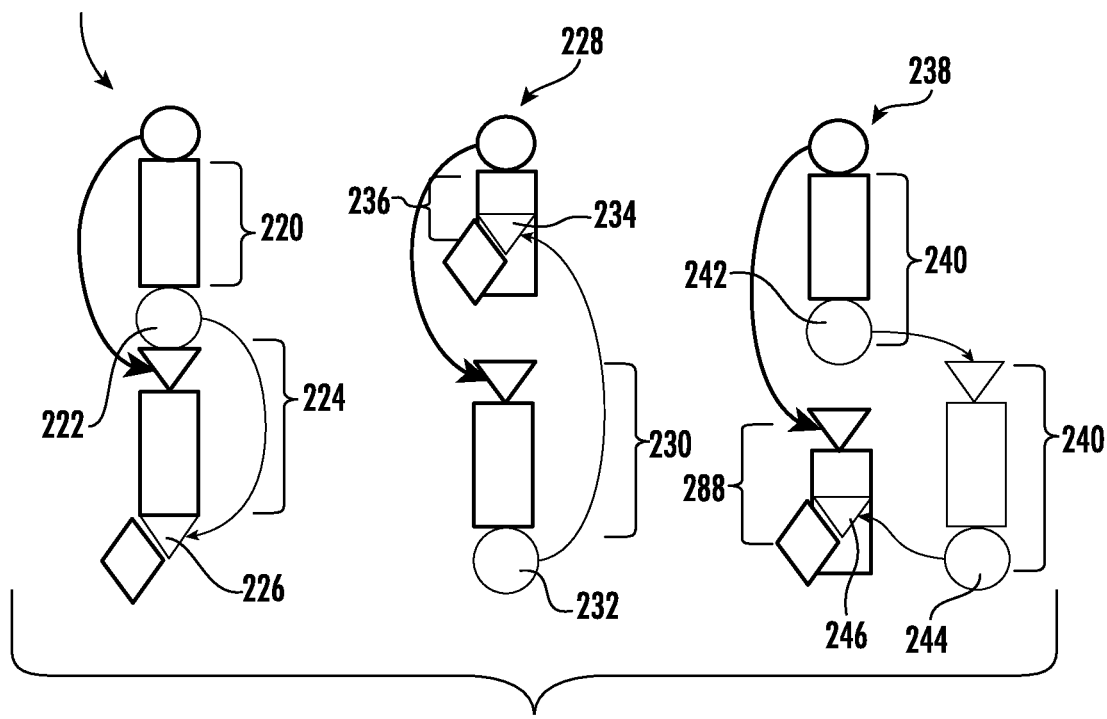
FIG. 2B is a graph of branch DSH variants.
Figure 3A:
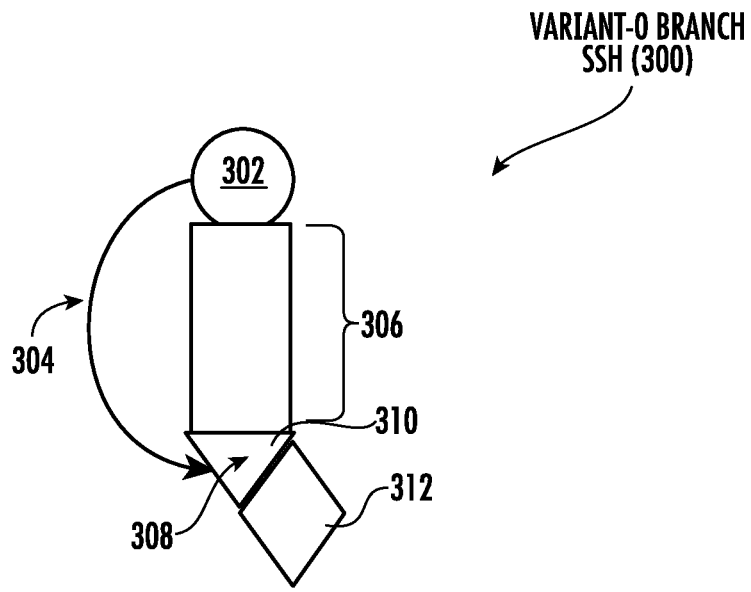
FIG. 3A is a graph of a first variant branch SSH to illustrate the convergence point being the branch target address of the conditional branch instruction, to illustrate a theory of detecting an first variant branch SSH.

FIG. 3A is a graph of a first variant branch single-sided hammock (SSH) 300 that can be present in an instruction stream processed by a processor. A first variant branch hammock is also referred to herein as a "variant-0" branch hammock. Thus, the first branch SSH 300 is also referred to herein as the "variant-0 branch SSH 300." The variant-0 branch SSH 300 includes a conditional branch instruction 302 that controls whether a branch is taken in a branch taken path 304 or not taken in a branch not taken path 306. If a branch is taken, a branch is made to a branch target address 308. As an example, what makes the variant-0 branch SSH 300 a branch hammock is the reconvergence of the branch taken path 304 and the branch not taken path 306 to a reconvergence point 310 in the branch taken path 304 that includes control independence (CI) instructions 312. Thus, if the branch is not taken from the conditional branch instruction 302, the variant-0 branch SSH 300 can be confirmed to be a branch hammock if an instruction processed after the conditional branch instruction 302 matches the branch target address 308 of the conditional branch instruction 302.

Figure 3B:
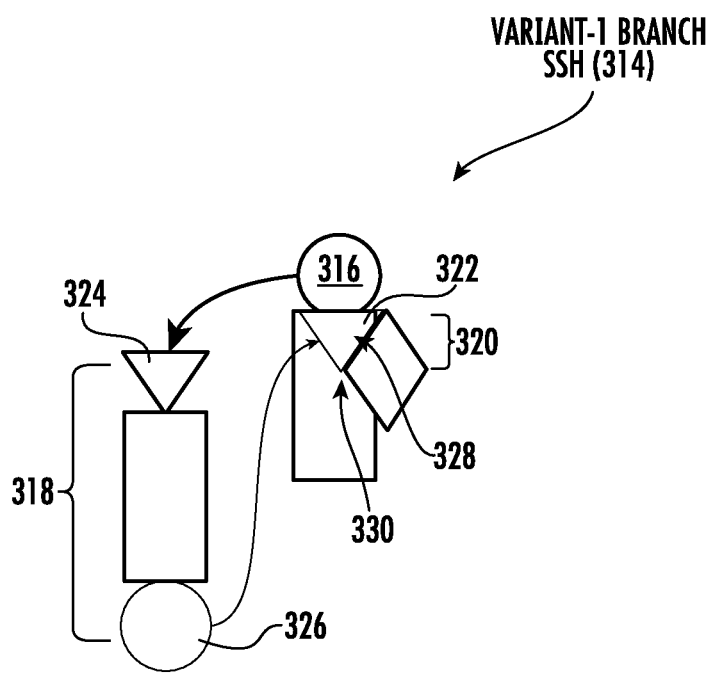
FIG. 3B is a graph of a second variant branch SSH to illustrate the convergence point being the branch fall-through address after the conditional branch instruction, to illustrate a theory of detecting a second variant branch SSH.

FIG. 3B is a graph of a second variant branch SSH 314 that can be present in an instruction stream processed by a processor. A second variant branch hammock is also referred to herein as a "variant-1" branch hammock. Thus, the second branch SSH 314 is also referred to herein as the "variant-1 branch SSH 314." The variant-1 branch SSH 314 includes a conditional branch instruction 316 that controls whether a branch is taken in a branch taken path 318 or not taken in a branch not taken path 320. If a branch is not taken, the instruction processing falls through to an instruction at branch fall-through address 322. If the branch is taken, a branch is made to a branch target address 324. The branch taken path 318 includes another branch instruction 326 to a reconvergence point 328 that is in the branch not taken path 320. As an example, what makes the variant-1 branch SSH 314 a branch hammock is the reconvergence of the branch taken path 318 and the branch not taken path 320 to a reconvergence point 328 that is in the branch not taken path 320 that includes control independence (CI) instructions 330. Thus, if the branch is taken from the conditional branch instruction 316, the variant-1 branch SSH 314 can be confirmed to be a branch hammock if an instruction after the conditional branch instruction 316 is the branch fall-through address 322 of the conditional branch instruction 316.

As will be discussed in more detail below, exemplary branch hammock detection circuits are disclosed that are configured to dynamically detect branch hammocks in an instruction stream during run-time processing of the instruction stream. In examples, the branch hammock detection circuit is configured to receive an indication of a conditional branch instruction (e.g., a program counter (PC) of the conditional branch instruction) being present in the instruction stream being processed in the instruction processing circuit. In response to a conditional branch instruction being identified, the branch hammock detection circuit starts a training process for a potential branch hammock predicated by the conditional branch instruction to determine whether an actual branch hammock is present. The branch hammock detection circuit is configured to determine if an identified in-training branch hammock is an actual branch hammock based on capturing a branch address for the conditional branch instruction based on whether a branch is taken or not taken by the instruction processing circuit for the conditional branch instruction. The target address is used to set a potential convergence point for the in-training branch hammock. If the branch hammock detection circuit determines that an instruction in the instruction stream at the set convergence point is processed (i.e., reached), this means the set convergence point was determined to be an actual convergence point. In response, the in-training branch hammock is detected as an actual branch hammock. The branch hammock detection circuit can also be configured to track information about the instructions processed during the training process of an in-training branch hammock. In this manner, this tracked information can be reused to optimize processing when the in-training branch hammock is confirmed to be an actual branch hammock. This tracked information may be useful to the instruction processing circuit when the same conditional branch instruction for the confirmed actual branch hammock is again encountered in an instruction stream.

Before discussing examples of branch hammock detection circuits configured to dynamically detect branch hammocks in an instruction stream during run-time processing of the instruction stream, an exemplary processing-based system that includes a processor with one or more central processing unit (CPU) cores and an exemplary instruction processing circuit that can be included in each of the one or more CPU cores to process fetched instructions for execution is first discussed with regard to FIGS. 4A and 4B.

In this regard, FIG. 4A is a diagram of an exemplary processor-based system 400 that includes a central processing unit (CPU) or processor 402 configured to issue memory requests (i.e., data read and data write requests) to a memory system 404 that includes a cache memory system 406 and a main memory 408. For example, the main memory 408 may be a dynamic random access memory (DRAM) provided in a separate DRAM chip. The processor 402 includes one or more respective CPU cores 410(1)-410(N), wherein 'N' is a positive whole number representing the number of CPU cores included in the processor 402. The processor 402 can be packaged in an integrated circuit (IC) chip 412. The cache memory system 406 includes one or more cache memories 414(1)-414(X) that may be at different hierarchies in the processor-based system 400 and that are logically located between the CPU cores 410(1)-410(N) and the main memory 408, where 'X' is a positive whole number representing the number of CPU cores included in the processor 402. A memory controller 416 controls access to the main memory 408. For example, a CPU core 410(1)-410(N) as a requesting device may issue a data request 418 to read data in response to processing a load instruction. The data request 418 includes a target address of the data to be read from memory. Using CPU core 410(1) as an example, if the requested data is not in a private cache memory 414(1) (i.e., a cache miss to cache memory 414(1)) which may be considered a level one (L1) cache memory, the private cache memory 414(1) sends the data request 418 over an interconnect bus 420 in this example to a shared cache memory 414(X) shared with all of the CPU cores 410(1)-410(N), which may be a level (3) cache memory. The requested data is eventually either obtained in a cache memory 414(1)-414(X) or main memory 408 if not contained in any of the cache memories 414(1)-414(X).

FIG. 4B illustrates an instruction processing circuit 422 that is provided in a CPU core 410, which can be any of the CPU cores 410(1)-410(N) in the processor 402 in FIG. 4A. The instruction processing circuit 422 includes one or more instruction pipelines $I_0$-$I_N$ for processing fetched computer instructions 424F fetched by an instruction fetch circuit 426 for execution from a series of instructions 424 stored in an instruction cache memory 428 or instruction memory 430, as examples. The instruction cache memory 428 may be provided as part of a cache memory 414(1)-414(X) in the cache memory system 406 in the processor-based system 400 in FIG. 4A. The instruction memory 430 may be provided in or as part of the main memory 408 in the processor-based system 400 in FIG. 4A. The instruction fetch circuit 426 is configured to provide fetched instructions 424F into the one or more instruction pipelines $I_0$-$I_N$ as an instruction stream 432 in the instruction processing circuit 422 to be pre-processed, before the fetched instructions 424F reach an execution circuit 434 to be executed. The instruction pipelines $I_0$-$I_N$ are provided across different processing circuits or stages of the instruction processing circuit 422 to pre-process and process the fetched instructions 424F in a series of steps that can be performed concurrently to increase throughput prior to execution of the fetched instructions 424F by the execution circuit 434.

With continuing reference to FIG. 4B, the instruction processing circuit 422 includes an instruction decode circuit 436 configured to decode the fetched instructions 424F fetched by the instruction fetch circuit 426 into decoded instructions 424D to determine the instruction type and actions required. The decoded instructions 424D are placed in one or more of the instruction pipelines $I_0$-$I_N$ and are next provided to a rename circuit 438 in the instruction processing circuit 422 to determine if any register names in the decoded instructions 424D need to be renamed to break any register dependencies that would prevent parallel or out-of-order processing. The rename circuit 438 is configured to call upon a register map table (RMT) 440 to rename a logical source register operand and/or write a destination register operand of a decoded instruction 424D to available physical registers 442(1)-442(X) ($P_0$, $P_1$, . . . , $P_X$) in a physical register file (PRF) 444. The RMT 440 contains a plurality of mapping entries each mapped to (i.e., associated with) a respective logical register $R_0$-$R_P$. The mapping entries are configured to store information in the form of an address pointer to point to a physical register 442(1)-442(X) in the PRF 444. Each physical register 442(1)-442(X) in the PRF 444 contains a data entry configured to store data for the source and/or destination register operand of a decoded instruction 424D.

The instruction processing circuit 422 also includes a register access (RACC) circuit 446 configured to access a physical register 442(1)-442(X) in the PRF 444 based on a mapping entry mapped to a logical register $R_0$-$R_P$ in the RMT 440 of a source register operand of a decoded instruction 424D to retrieve a produced value from an executed instruction 424E in the execution circuit 434. The RACC circuit 446 is also configured to provide the retrieved produced value from an executed decoded instruction 424E as the source register operand of a decoded instruction 424D to be executed. Also, in the instruction processing circuit 422, a scheduler circuit 448 is provided in the instruction pipeline $I_0$-$I_N$ and is configured to store decoded instructions 424D in reservation entries until all source register operands for the decoded instruction 424D are available. The scheduler circuit 448 issues decoded instructions 424D ready to be executed in an execution lane $L_0$-$L_K$ to the execution circuit 434. A write circuit 450 is also provided in the instruction processing circuit 422 to write back or commit produced values from executed instructions 424E to memory, such as the PRF 444, cache memory system 406 or main memory 408.

With continuing reference to FIG. 4B, as will be discussed in more detail below, the instruction processing circuit 422 also includes a branch hammock detection circuit 452 in this example. The branch hammock detection circuit 452 is configured to receive instruction information 454 about fetched instructions 424F to be processed in the instruction stream 432 in the instruction processing circuit 422. For example, the instruction information 454 can include identification of conditional branch instructions 424F in the fetched instructions 424F. For example, the instruction information 454 can include a construction branch record that includes an instruction identifier of the conditional branch instruction 424F, a branch target address in the instruction stream 432, and the fall-through branch address in the instruction stream 432. For example, the instruction identifier may be a program counter (PC) of the conditional branch instruction 424F. The branch hammock detection circuit 452 is configured to start a training process for a potential branch hammock predicated by the conditional branch instruction 424F as an "in-training branch hammock"

to determine whether an actual branch hammock is present. The branch target address and fall-through branch address in the instruction information 454 as well as information on other instructions 424F following the conditional branch instruction 424F can be used to set a potential convergence point for the in-training branch hammock. If the branch hammock detection circuit 452 determines that an instruction in the instruction stream at the set convergence point is processed (i.e., reached), this means the set convergence point was determined to be an actual convergence point. In response, the in-training branch hammock is designated as an actual branch hammock. The branch hammock detection circuit 452 is configured to generate a branch hammock predictor 456 in response to receiving instruction information 454 that matches a previously confirmed branch hammock.

FIG. 5A is a diagram of an exemplary branch hammock detection circuit 452 that can be included in the instruction processing circuit 422 in the processor 402 in FIG. 4B and configured to detect a branch hammock in the instruction stream 432 of the instruction processing circuit 422. In this example, the branch hammock detection circuit 452 includes a branch training control circuit 500. The branch training control circuit 500 includes a branch hammock control circuit 502 and a branch hammock trainer circuit 504. The branch training control circuit 500 is configured to receive an indicator of a conditional branch instruction 424F from the instruction processing circuit 422 in FIG. 4B. For example, the indicator of a conditional branch instruction 424F may be a program counter (PC) of an address of the conditional branch instruction 424F in the instruction stream 432. The indication of a conditional branch instruction 424F may be contained in a conditional branch instruction record 506 received by the branch hammock detection circuit 452 that also includes the branch target address of the conditional branch instruction 424F, and the branch fall-through address of the conditional branch instruction 424F. Each received indicator of a conditional branch instruction 424F initiates the branch training control circuit 500 to initiate a training process to detect whether a branch hammock is in the instruction stream 432 predicated by the conditional branch instruction 424F. The detection of a branch hammock for a conditional branch instruction 424F can be used by the processor to optimize processing, including when the conditional branch instruction 424F is again processed at a later time. For example, the data produced by instructions in the branch hammock may be used to predict data produced by instructions following a subsequent receipt and processing of the conditional branch instruction 424F.

With continuing reference to FIG. 5A, in this example, to be able to track information regarding a potential branch hammock predicated by a notification of a conditional branch instruction 424F in the conditional branch instruction record 506, a branch hammock control circuit 502 in the branch training control circuit 500 initiates a training process called an in-training branch hammock. In other words, it is initially assumed that the instructions 424F that follow the conditional branch instruction 424F in the instruction stream 432 are a branch hammock. However, the branch hammock is identified as an "in-training" branch hammock to confirm an actual branch hammock in dynamic operation of the instruction processing circuit 422. This is because instructions 424F that follow the conditional branch instruction 424F must be followed to confirm that a taken instruction flow path and a not taken instruction flow path from the conditional branch instruction 424F converge at a convergence address in the instruction stream 432. To initiate the training process for an in-training branch hammock, the branch hammock control circuit 502 is configured to allocate a branch state entry 508 associated with the indicator (e.g., PC) for a branch condition instruction among a plurality of branch state entries 508(1)-508(B) in a branch state table circuit 510. As will be discussed in more detail below, each branch state entry 508(1)-508(B) includes entries that can be used to track and store information about an in-training branch hammock as the instruction processing circuit 422 processes instructions following the conditional branch instruction 424F. Not only can the branch state entries 508(1)-508(B) be used to record dynamic information to assist in confirming or not confirming the in-training branch hammock is an actual branch hammock, but the branch state entries 508(1)-508(B) can also be used to record information about the instructions 424F executed following the conditional branch instruction 424F to be used for predicting future values of the instructions 424F when the conditional branch instruction 424F is fetched again into the instruction processing circuit 422. Information about instructions 424F that are processed following the conditional branch instruction 424F is received through instruction information 454 from the instruction processing circuit 422, such as from the instruction fetch circuit 426.

With continuing reference to FIG. 5A, the branch hammock detection circuit 452 also includes a branch hammock trainer circuit 504. The branch hammock trainer circuit 504 includes a plurality of trainer circuits 512(1)-512(T). As will be discussed in more detail below, the trainer circuits 512(1)-512(T) are configured to perform a training process for an in-training branch hammock that is allocated in a branch state entry 508(1)-508(B) in the branch state table circuit 510 in response to receiving an indicator of a conditional branch instruction 424F in the received conditional branch instruction record 506. A trainer circuit 512(1)-512(T) is allocated to an in-training branch hammock to perform the training process while in an in-training state. The trainer circuit 512(1)-512(T) is dissociated from an in-training branch hammock once it is either confirmed as an actual branch hammock or the training to confirm the in-training branch hammock as an actual branch hammock fails. This architecture allows the trainer circuit 512(1)-512(T) to be associated and dissociated as needed to conserve resources instead of having to provide a dedicated trainer circuit 512(1)-512(T) for each branch state entry 508(1)-508(B) in the branch state table circuit 510, if desired. As will be discussed in more detail below, when during the training of an in-training branch hammock, the associated trainer circuit 512(1)-512(T) uses the information received in the instruction information 454 from the instruction processing circuit 422 to perform the training process and determine if the in-training branch hammock is an actual branch hammock. The trainer circuit 512(1)-512(T) may generate in-training branch hammock data 514 in a branch state entry 508(1)-508(B) allocated to the in-training branch hammock as part of the training process that includes a branch hammock indicator 515 indicating the in-training branch hammock is an actual branch hammock corresponding to the conditional branch instruction 424F. Also, the trainer circuits 512(1)-512(T) are configured to generate a branch hammock indicator 515 indicating that the in-training branch hammock is confirmed as an actual branch hammock as part of the in-training branch hammock data 514 to update the associated branch state entry 508(1)-508(B) in the branch state table circuit 510 for the in-training branch hammock. The captured confirmation of the actual branch hammock in a branch state entry 508(1)-508(B) in the branch state table circuit 510 can be provided as a branch hammock predictor 456 to the instruction processing circuit 422 when the conditional branch instruction 424F that predicated the branch hammock is detected again.

FIG. 5B illustrates an exemplary branch state table circuit 510 that can be provided in or accessed by the branch hammock detection circuit 452 in FIG. 5A to track information of identified in-training and actual branch hammocks in a processed instruction stream 432 in the instruction processing circuit 422 in FIG. 4B. As shown therein, each branch state entry 508(1)-508(B) contains a variety of possible entries to store information regarding in-training branch hammocks and actual branch hammocks confirmed from the in-training branch hammocks as a result of the training process. For example, a PC entry 518 in branch state entry 508(1)-508(B) can record the PC of the conditional branch instruction 424F received in the conditional branch instruction record 506 when the branch state entry 508(1)-508(B) for the conditional branch instruction 424F is allocated. The branch state entries 508(1)-508(B) may also contain a trained entry 520 to indicate if the in-training branch hammock associated with the conditional branch instruction 424F identified by the PC entry 518 is trained or not trained. The branch state entries 508(1)-508(B) may also contain an SSH entry 522 to record if the in-training branch hammock associated with the conditional branch instruction 424F was confirmed as a branch SSH by a trainer circuit 512(1)-512(T). For example, a logic state of '1' may represent a branch SSH state, and a logic state of '0' may represent a not branch SSH state. The branch state entries 508(1)-508(B) may also contain a DSH entry 524 to record if the in-training branch hammock associated with the conditional branch instruction 424F was confirmed as a branch DSH by a trainer circuit 512(1)-512(T). For example, a logic state of '1' may represent a branch DSH state, and a logic state of '0' may represent a not branch DSH state. The branch state entries 508(1)-508(B) may also contain a variant-1 entry 526 to record if the in-training branch hammock associated with the conditional branch instruction 424F was confirmed as a variant-1 branch hammock or variant-0 branch hammock. For example, a logic state of '1' may represent variant-1, and a logic static of '0' may represent variant-0. The branch state entries 508(1)-508(B) may also contain a path length entry 528 to record the number of instruction flow paths processed by the instruction processing circuit 422 following the conditional branch instruction 424F identified by the PC entry 518 and processed by a trainer circuit 512(1)-512(T) as part of the training of an in-training branch hammock. The trainer circuit 512(1)-512(T) may be configured to fail confirming an in-training branch hammock as an actual branch hammock if the path length is too long before the in-training branch hammock can be confirmed as an actual branch hammock.

With continuing reference to FIG. 5B, the branch state entries 508(1)-508(B) may also contain path data entries 530(1)-530(D) to record the data produced by instructions processed by the instruction processing circuit 422 following the conditional branch instruction 424F identified by the PC entry 518. An associated trainer circuit 512(1)-512(T) can receive this instruction data produced by instructions as part of the instruction information 454 and provide such information as part of the in-training branch hammock data 514 to be stored in the associated branch state entries 508(1)-508(B). This stored data may be used to predict data produced by instructions following a next occurrence of the conditional branch instruction 424F. The branch state entries 508(1)-508(B) may also contain a convergence address entry 532 to record a potential convergence address for the conditional branch instruction 424F identified by the PC entry 518 to be used to determine if the in-training branch hammock predicated by the conditional branch instruction 424F is an actual branch hammock. The branch state entries 508(1)-508(B) may also contain a confidence entry 534 to record a confidence indication indicating the relative confidence that the data in the other entries in the respective branch state entries 508(1)-508(B) are valid, including if an in-training branch hammock associated with the branch state entry 508(1)-508(B) is confirmed as an actual branch hammock. The confidence entry 534 may be a counter that is increased when training is passed and decreased when training is not passed for an in-training branch hammock predicated by a particular conditional branch instruction 424F. The branch state entries 508(1)-508(B) may also contain a count entry 536 to record an occurrence count of conditional branch instructions 424F. As discussed above, data captured for an in-training branch hammock confirmed as an actual branch hammock remains in its branch state entry 508(1)-508(B) in the branch state table circuit 510 to be used to generate the branch hammock predictor 456. However, eventually, a branch state entry 508(1)-508(B) will need to be evicted to make room for a new in-training branch hammock. The count entry 536 for a branch state entry 508(1)-508(B) may be used for a replacement policy to determine which branch state entry 508(1)-508(B) gets evicted first (e.g., a least occurrence evicted first policy).

FIG. 6 is a flowchart illustrating an exemplary process 600 of the branch hammock detection circuit 452, and more particularly its branch hammock control circuit 502 receiving notification of a conditional branch instruction 424F fetched by the instruction processing circuit 422 in FIG. 4B and establishing an in-training branch hammock in a branch state entry 508(1)-508(B) in the branch state table circuit 510 for training. In this regard, as shown in FIG. 6, the branch hammock training starts by the branch hammock control circuit 502 receiving the conditional branch instruction record 506 that includes an indicator of a conditional branch instruction 424F (e.g., its PC) (block 602). The branch hammock control circuit 502 looks up the indicator of the conditional branch instruction 424F in the branch state table circuit 510 (block 604) to determine if there is a branch state entry 508(1)-508(B) in the branch state table circuit 510 already established for the conditional branch instruction 424F (block 606). If not, the branch hammock control circuit 502 determines if a new branch state entry 508(1)-508(B) in the branch state table circuit 510 can be established (block 608). If not, training for the conditional branch instruction 424F is stopped (block 612). If, however, the branch hammock control circuit 502 determines a new branch state entry 508(1)-508(B) in the branch state table circuit 510 can be established (block 610), the branch hammock control circuit 502 establishes a new branch state entry 508(1)-508(B) in the branch state table circuit 510 for the conditional branch instruction 424F to create an in-training branch hammock (block 612). If, in block 606, there was a branch state entry 508(1)-508(B) in the branch state table circuit 510 already established for the conditional branch instruction 424F, the new information in the conditional branch instruction record 506 is merged into the existing branch state entry 508(1)-508(B) (block 614). The branch hammock control circuit 502 then determines if there is an available, free branch trainer 512(1)-512(T) in the branch hammock trainer circuit 504 to train the in-training branch hammock in new branch state entry 508(1)-508(B) (block 616). If so, the branch hammock training of the in-training branch hammock is initiated in the assigned trainer circuit 512(1)-512(T) in the branch hammock trainer circuit 504 (block 618).

The branch hammock control circuit 502 can generate a start training indicator 538 as shown in FIG. 5A to cause the trainer circuit 512(1)-512(T) to start the training of the associated in-training branch hammock based on the indicator of the conditional branch instruction 424F, for example. Other data from the conditional branch instruction record 506 can be also be provided to the assigned trainer circuit 512(1)-512(T) for the in-training branch hammock to use as part of the training process. This is shown by example in FIG. 7, which is another exemplary trainer circuit 512 that can any of the trainer circuits 512(1)-512(T) in the branch hammock trainer circuit 504 in FIG. 5A. As shown in FIG. 7, the trainer circuit 512 is configured to receive a start training indicator 538 from the branch hammock control circuit 502 to start the training process for an in-training branch hammock assigned to the trainer circuit 512. The trainer circuit 512 is also configured to receive information in the conditional branch instruction record 506 for the in-training branch hammock including the PC of the conditional branch instruction 424F, the branch target address of the conditional branch instruction 424F, the branch fall-through address of the conditional branch instruction 424F, whether the branch of the conditional branch instruction 424F was taken or not taken by the instruction processing circuit 422, and other input state data.

The trainer circuit 512 in FIG. 7 is also configured to receive the instruction information 454 about instructions processed by the instruction processing circuit 422, including the current PC of the instruction 424F being processed, an indication of whether the currently processed instruction is a branch instruction (IS_BRANCH), an indication of whether the currently processed instruction is an unconditional instruction (IS_JUMP), an indication of whether the currently processed instruction is a return instruction (IS_RET), an indication of whether the currently processed instruction is another conditional branch instruction (IS_TAKEN), and the branch target address of the other conditional branch instruction (BR_TARGET). All this received information can be used to perform the training process for in-training branch hammock assigned to the trainer circuit 512 to determine if the in-training branch hammock can be confirmed as an actual branch hammock.

As discussed previously, a branch hammock may be a branch SSH or branch DSH. It may be desired to configure the trainer circuit 512 to confirm whether an in-training branch hammock is a branch SSH or DSH. In this regard, FIG. 8 is a flowchart illustrating an exemplary process 800 of a trainer circuit 512 in the branch hammock trainer circuit 504 conducting a dynamic training process for an identified in-training branch hammock to determine if the in-training branch hammock is an actual branch SSH.

With reference to FIG. 8, the training process to determine if the in-training branch hammock is a branch SSH starts in response to the receipt of the start training indicator 538 (block 802). The trainer circuit 512 receives the PC of the conditional branch instruction 424F, the branch target address of the conditional branch instruction 424F, the branch fall-through address of the conditional branch instruction 424F, whether the branch of the conditional branch instruction 424F was taken or not taken by the instruction processing circuit 422, and other input state data from the conditional branch instruction record 506 (block 804). The trainer circuit 512 receives the training state in the trained entry 520 in the branch state entry 508(1)-508(B) in the branch state table circuit 510 associated with the in-training branch hammock (block 804). Training starts by the trainer circuit 512 receiving the instruction information 454 for instructions processed by the instruction processing circuit 422 (block 806). Instruction information 454 for a next instruction 424F processed by the instruction processing circuit 422 is received (block 808). The trainer circuit 512 determines if the current PC in the instruction processing circuit 422 is equal to a set potential convergence address (RCPC) (block 810). On the first iteration of the training process in FIG. 8, the current PC is not equal to a set potential convergence address (RCPC).

With continuing reference to FIG. 8, the trainer circuit 512 then determines if the branch of the conditional branch instruction 424F that predicated the in-training branch hammock was taken from the received conditional branch instruction record 506 (block 812). If not, this means that the training can be performed to determine if the in-training branch hammock is a variant-0 branch SSH. As previously discussed with reference to FIG. 3A above, what makes the variant-0 branch SSH is the reconvergence of the branch taken path and the branch not taken path to a reconvergence point in the branch taken path. Thus, if the branch is not taken from the conditional branch instruction 424F for the in-training branch hammock, an in-training branch hammock may be confirmed to be a variant-0 branch SSH if an instruction processed after the conditional branch instruction 424F matches the branch target address of the conditional branch instruction 424F. In this regard, the trainer circuit 512 sets a potential convergence address (RCPC) for the in-training branch hammock to the branch target address (BRTGT) for the conditional branch instruction 424F when the conditional branch instruction 424F is not taken (block 814). If the current PC in the received instruction information 454 matches the potential convergence address for the in-training branch hammock to the branch target address, this means that the potential convergence address is confirmed as a convergence address for the in-training hammock and the in-training hammock can be confirmed as a branch SSH. After the trainer circuit 512 sets a potential convergence address for the in-training branch hammock to the branch target address for the conditional branch instruction 424F (block 814), for each new instruction received in the instruction information 454, a path length entry 528 in the branch state entry 508(1)-508(B) in the branch state table circuit 510 is updated via the in-training branch hammock data 514 by the trainer circuit 512 (block 818). Instruction path data from data received in the instruction information 454 as a result of the instruction processing circuit 422 processing instructions 424F following the conditional branch instruction 424F is also updated in the branch state entries 508(1)-508(B) in the branch state table circuit 510 via the in-training branch hammock data 514 by the trainer circuit 512 (block 818).

With continuing reference to FIG. 8, the trainer circuit 512 determines if the path length (PL) in the path length entry 528 in the branch state entry 508(1)-508(B) in the branch state table circuit 510 for the in-training branch hammock is greater than a defined path length threshold or if the current PC is equal to the PC of the conditional branch instruction 424F (BRPC) (block 820). If so, in this example, the training for the in-training branch hammock will fail as not being able to be confirmed as a branch SSH (block 824). The trainer circuit 512 may generate a branch hammock indicator 515 as part of the in-training branch hammock data 514 indicating the in-training branch hammock was not detected as an actual SSH hammock (block 824). Also in this example, the confidence in the confidence entry 534 in the branch state entry 508(1)-508(B) in the branch state table circuit 510 for the in-training branch hammock is updated by the trainer circuit 512 to be decreased (block 824). The count in the count entry 536 in the branch state entry 508(1)-508(B) in the branch state table circuit 510 for the in-training branch hammock is updated by the trainer circuit 512 to be increased (block 824). The trained state in the trained entry 520 in the branch state entry 508(1)-508(B) in the branch state table circuit 510 for the in-training branch hammock is updated by the trainer circuit 512 to be increased and set to a not trained state, meaning the conditional branch instruction 424F could not be confirmed as predicating a branch hammock. The trainer circuit 512 then determines if the current instruction in the received instruction information 454 is a return instruction or a branch instruction (block 822). If so, training again is failed, because a branch SSH does not encounter a return instruction or branch instruction before the convergence address in the instruction stream 432 is encountered. In response, the steps in block 824 can be performed.

If training does not fail for the current PC for the case of the branch of the conditional branch instruction 424F being not taken, and the current instruction in the received instruction information 454 is not a return instruction or a branch instruction (block 822), the process repeats back to block 808 to receive instruction information 454 for a next instruction 424F to be processed by the instruction processing circuit 422 and process such information for training of the in-training branch hammock. If the current PC equals the set potential convergence point (RCPC) in block 810 before the training fails in block 824, the training of the in-training branch hammock will pass (block 826). The trainer circuit 512 may generate a branch hammock indicator 515 as part of the in-training branch hammock data 514 indicating the in-training branch hammock was detected as an actual branch SSH (block 826). The trained state in the trained entry 520 in the branch state entry 508(1)-508(B) in the branch state table circuit 510 for the in-training branch hammock is updated by the trainer circuit 512 to be increased and set to a trained state, meaning the conditional branch instruction 424F is confirmed as predicating a branch hammock (block 826). The SSH entry 522 in the branch state entry 508(1)-508(B) in the branch state table circuit 510 for the in-training branch hammock is updated by the trainer circuit 512 to indicate that the conditional branch instruction 424F is confirmed as predicating a branch SSH (block 826). The variant-1 entry 526 in the branch state entry 508(1)-508(B) in the branch state table circuit 510 for the in-training branch hammock is updated by the trainer circuit 512 to indicate that the conditional branch instruction 424F is confirmed as predicating a variant-0 branch SSH (block 826). The confidence in the confidence entry 534 in the branch state entry 508(1)-508(B) in the branch state table circuit 510 for the in-training branch hammock is updated by the trainer circuit 512 to be increased (block 826). The count in the count entry 536 in the branch state entry 508(1)-508(B) in the branch state table circuit 510 for the in-training branch hammock is updated by the trainer circuit 512 to be increased (block 826). With continuing reference to FIG. 8, if, in block 812, the trainer circuit 512 determines that the branch of the conditional branch instruction 424F that predicated the in-training branch hammock was not taken from the received conditional branch instruction record 506 (block 812), this means that the training can be performed to determine if the in-training branch hammock is a variant-0 branch SSH. As previously discussed with reference to FIG. 3B above, what makes the variant-0 branch SSH is the reconvergence of the branch taken path and the branch not taken path to a reconvergence point in the branch not taken path. Thus, if the branch is taken from the conditional branch instruction 424F for the in-training branch hammock, the in-training branch hammock may be confirmed to be a variant-1 branch SSH if an instruction processed after the conditional branch instruction 424F matches the branch fall-through address of the conditional branch instruction 424F. In this regard, the trainer circuit 512 sets a potential convergence address (RCPC) for the in-training branch hammock to the branch fall-through address (BRFT) for the conditional branch instruction 424F when the conditional branch instruction 424F is taken (block 816). If the current PC in received instruction information 454 matches the potential convergence address for the in-training branch hammock to the branch target address, this means that the potential convergence address is confirmed as a convergence address for the in-training hammock and the in-training hammock can be confirmed as a branch SSH. After the trainer circuit 512 sets a potential convergence address for the in-training branch hammock to the branch fall-through address for the conditional branch instruction 424F (block 816), for each new instruction received in the instruction information 454, a path length entry 528 in the branch state entry 508(1)-508(B) in the branch state table circuit 510 is updated via the in-training branch hammock data 514 by the trainer circuit 512 (block 818). Instruction path data from data received in the instruction information 454 as a result of the instruction processing circuit 422 processing instructions 424F following the conditional branch instruction 424F is also updated in the branch state entries 508(1)-508(B) in the branch state table circuit 510 via the in-training branch hammock data 514 by the trainer circuit 512 (block 818).

With continuing reference to FIG. 8, the trainer circuit 512 then determines if the path length (PL) in the path length entry 528 in the branch state entry 508(1)-508(B) in the branch state table circuit 510 for the in-training branch hammock is greater than a defined path length threshold or if the current PC is equal to the PC of the conditional branch instruction 424F (BRPC) (block 820). If so, in this example, the training for the in-training branch hammock will fail as not being able to be confirmed as a branch SSH (block 824). In this example, the confidence in the confidence entry 534 in the branch state entry 508(1)-508(B) in the branch state table circuit 510 for the in-training branch hammock is updated by the trainer circuit 512 to be decreased (block 824). The count in the count entry 536 in the branch state entry 508(1)-508(B) in the branch state table circuit 510 for the in-training branch hammock is updated by the trainer circuit 512 to be increased (block 824). The trained state in the trained entry 520 in the branch state entry 508(1)-508(B) in the branch state table circuit 510 for the in-training branch hammock is updated by the trainer circuit 512 to be increased and set to a not trained state meaning the conditional branch instruction 424F could not be confirmed as predicating a branch hammock. The trainer circuit 512 then determines if the current instruction in the received instruction information 454 is a return instruction or a branch instruction (block 822). If so, training again is failed, because a branch SSH does not encounter a return instruction or branch instruction before the convergence address in the instruction stream 432 is encountered. In response, the steps in block 824 can be performed.

If training does not fail for the current PC for the case of the branch of the conditional branch instruction 424F being taken, and the current instruction in the received instruction information 454 is not a return instruction or branch instruction (block 822), the process repeats back to block 808 to receive instruction information 454 for a next instruction 424F processed by the instruction processing circuit 422 and process such information for the training of the in-training branch hammock. If the current PC (PC) equals the set potential convergence point (RCPC) in block 810 before the training fails in block 824, the training of the in-training branch hammock will pass (block 826). The trained state in the trained entry 520 in the branch state entry 508(1)-508(B) in the branch state table circuit 510 for the in-training branch hammock is updated by the trainer circuit 512 to be increased and set to a trained state meaning the conditional branch instruction 424F is confirmed as predicating a branch hammock. The SSH entry 522 in the branch state entry 508(1)-508(B) in the branch state table circuit 510 for the in-training branch hammock is updated by the trainer circuit 512 to indicate that the conditional branch instruction 424F is confirmed as predicating a branch SSH. The variant-1 entry 526 in the branch state entry 508(1)-508(B) in the branch state table circuit 510 for the in-training branch hammock is updated by the trainer circuit 512 to indicate that the conditional branch instruction 424F is confirmed as predicating a variant-1 branch SSH.

To further illustrate detection of a branch SSH, FIG. 9A is an example of an instruction stream 900 that includes a variant-0 branch SSH that can be detected by the branch hammock detection circuit 452 in FIGS. 4B and 5A according to the exemplary processes 600 and 800 in FIGS. 6 and 8. Block 902 shows the processing of the instruction stream 900 to detect a variant-0 branch SSH. As shown in 904(1) of block 902 in FIG. 9A, conditional branch instruction 'A' as a branch to instruction 'C' (Br C) will cause the branch hammock control circuit 502 in the branch hammock detection circuit 452 in FIG. 5A to establish a new branch state entry 508(0)-508(B) in the branch state table circuit 510 and assign a trainer circuit 512(1)-512(T) in the branch hammock trainer circuit 504 per the process 600 in FIG. 6. In 904(2), if the branch was not taken by processing conditional branch instruction 'A' by the instruction processing circuit 422 as part of the received conditional branch instruction record 506, the assigned trainer circuit 512(1)-512(T) is initiated with the current PC being equal to 'A' and being set a potential convergence address (RCPC) to a branch target address of instruction 'C' to train the in-training branch hammock for a variant-0 SSH (see also, block 814 in FIG. 8). In 904(3), however, the branch was taken by processing conditional branch instruction 'A' by the instruction processing circuit 422 as part of the received conditional branch instruction record 506, and the assigned trainer circuit 512(1)-512(T) is initiated with the current PC being equal to 'A' and a potential convergence address (RCPC) being set to a branch fall-through address of instruction 'B' to train the in-training branch hammock for a variant-1 SSH (see also, block 816 in FIG. 8).

In this example, it is assumed that the path length threshold for the path length (PL) is set to eight (8) in 904(4). In 904(5), the assigned trainer circuit 512(1)-512(T) then receives the instruction information 454 for next instruction 'B' with the path length being less one (1) and determines that the address of instruction 'B' is not the set potential convergence address (RCPC) (see also, blocks 818, 820 in FIG. 8). Also in 904(5), the assigned trainer circuit 512(1)-512(T) determines that the path length (PL) of the in-training branch hammock is less than the path length threshold. In 904(6), the assigned trainer circuit 512(1)-512(T) then receives the instruction information 454 for next instruction 'C,' whose address is equal to the potential convergence address (RCPC). Because the path length is now two (2) and the address of instruction 'C' matches the set potential convergence address (RCPC), training is passed and complete, and the in-training branch hammock is determined to be an actual variant-0 branch SSH (see blocks 820, 810, 826 in FIG. 8). The branch state entry 508(0)-508(B) in the branch state table circuit 510 is updated by the trainer circuit 512(1)-512(T) for a passed training as discussed above (see block 826 in FIG. 8).

FIG. 9B is an example of an instruction stream 910 that includes a variant-1 branch SSH that can be detected by the branch hammock detection circuit 452 in FIGS. 4B and 5A according to the exemplary processes 600 and 800 in FIGS. 6 and 8. Block 912 shows the processing of the instruction stream 900 to detect a variant-0 branch SSH. As shown in 914(1) of block 912 in FIG. 9A, conditional branch instruction 'A' as a branch to instruction 'C' (Br C) will cause the branch hammock control circuit 502 in the branch hammock detection circuit 452 in FIG. 5A to establish a new branch state entry 508(0)-508(B) in the branch state table circuit 510 and assign a trainer circuit 512(1)-512(T) in the branch hammock trainer circuit 504 per the process 600 in FIG. 6. In 914(2), if the branch was taken by processing conditional branch instruction 'A' by the instruction processing circuit 422 as part of the received conditional branch instruction record 506, the assigned trainer circuit 512(1)-512(T) is initiated with the current PC being equal to 'A' and set a potential convergence address (RCPC) to a branch fall-through address of instruction 'B' to train the in-training branch hammock for a variant-1 SSH (see also, block 816 in FIG. 8). In 914(3), however, the branch was not taken by processing conditional branch instruction 'A' by the instruction processing circuit 422 as part of the received conditional branch instruction record 506, and the assigned trainer circuit 512(1)-512(T) is initiated with the current PC being equal to 'A' and a potential convergence address (RCPC) being set to a branch target address of instruction 'C' to train the in-training branch hammock for a variant-1 SSH (see also, block 814 in FIG. 8).

In this example, it is assumed that the path length threshold for the path length (PL) is set to eight (8) in 914(4). In 914(5), the assigned trainer circuit 512(1)-512(T) then receives the instruction information 454 for next instruction 'C' with the path length being less one (1) and determines that the address of instruction 'C' is not the set potential convergence address (RCPC) (see also, blocks 818, 820 in FIG. 8). Also in 914(5), the assigned trainer circuit 512(1)-512(T) determines that the path length (PL) of the in-training branch hammock is less than the path length threshold. In 914(6), the assigned trainer circuit 512(1)-512(T) then receives the instruction information 454 for next instruction 'C,' whose address is not equal to the potential convergence address (RCPC). In 914(7), the assigned trainer circuit 512(1)-512(T) determines if the next instruction 'B' is equal to the potential convergence address (RCPC). Because the path length is now three (3) and the address of instruction 'B' matches the set potential convergence address (RCPC), training is passed and complete, and the in-training branch hammock is determined to be an actual variant-1 branch SSH (see blocks 820, 810, 826 in FIG. 8).

Even if an in-training branch hammock fails to be confirmed as a branch SSH, it can be trained to determine if it is a branch DSH. FIG. 10A is a graph of a first variant branch DSH 1000, also referred to herein as the "variant-0 branch DSH 1000." The variant-0 branch DSH 100 can be present in the instruction stream 432 processed by the instruction processing circuit 422 in FIG. 4B. The variant-0 branch DSH 1000 includes a conditional branch instruction 1002 that controls whether a branch is taken in a branch taken path 1004 or not taken path 1006. If a branch is taken, a branch is made to a branch target address 1008. If a branch is not taken, the instruction processing falls through to the branch fall-through address 1010. What makes the variant-0 branch DSH 1000 a branch hammock is the branch taken path 1004 and the branch not taken path 1006 both containing their own respective control-dependent instructions with the end of the branch taken path 1004 and the branch not taken path 1006 going to a reconvergence point 1012 that includes control independence (CI) instructions 1014. Thus, both the branch taken path 1004 and the branch not taken path 1006 have to be analyzed to determine if both paths converge to the reconvergence point 1012.

FIG. 10B is a graph of a second variant branch DSH 1016 that can be present in the instruction stream 432 processed by the instruction processing circuit 422 in FIG. 4B. The second variant branch DSH 1016 is also referred to herein as the "variant-1 branch DSH 1016." The variant-1 branch DSH 1016 includes a conditional branch instruction 1018 that controls whether a branch is taken in a branch taken path 1020 or branch not taken path 1022. If the branch is not taken, the instruction processing falls through to an instruction at branch fall-through address 1024. If the branch is taken, a branch is made to a branch target address 1026. The branch taken path 1020 includes another branch instruction 1028 to a reconvergence point 1030 that is in the branch not taken path 1022. What makes the variant-1 branch DSH 1016 a branch hammock is the reconvergence of the branch taken path 1020 and the branch not taken path 1022 to the reconvergence point 1030 that includes control-independent (CI) instructions 1032. Thus, both the branch taken path 1020 and the branch not taken path 1022 have to be analyzed to determine if both paths converge to the reconvergence point 1030.

Thus, a training process to detect a branch DSH can involve training on both the branch taken and branch not taken paths. In this regard, FIG. 11 is a flowchart illustrating an exemplary process 1100 of a trainer circuit 512 in the branch hammock trainer circuit 504 in FIG. 5B conducting a dynamic training process for an identified in-training branch hammock to determine if the in-training branch hammock if an actual branch DSH.

With reference to FIG. 11, the training process to determine if the in-training branch hammock is a branch DSH starts in response to the receipt of the start training indicator 538 (block 1102). The assigned trainer circuit 512 receives the PC of the conditional branch instruction 424F, the branch target address of the conditional branch instruction 424F, the branch fall-through address of the conditional branch instruction 424F, whether the branch of the conditional branch instruction 424F was taken or not taken by the instruction processing circuit 422, and other input state data from the conditional branch instruction record 506 (block 1104). The trainer circuit 512 receives the training state in the trained entry 520 in the branch state entry 508(1)-508(B) in the branch state table circuit 510 associated with the in-training branch hammock (block 1104). An in-training wait confirmation indicator is set to a not wait confirmation state for the first iteration of the training process. The assigned trainer circuit 512 determines if a Taken state indicator for the in-training branch hammock is equal to a Taken state and if the in-training wait confirmation indicator is equal to a not wait confirmation state (block 1106). If not, training starts by the trainer circuit 512 receiving the instruction information 454 for instructions processed by the instruction processing circuit 422 (block 1108). Instruction information 454 for a next instruction 424F processed by the instruction processing circuit 422 is received (block 1110). The trainer circuit 512 determines if the in-training wait confirmation indicator is a wait confirmation state (block 1112). If not, a path length entry 528 in the branch state entry 508(1)-508(B) in the branch state table circuit 510 is updated via the in-training branch hammock data 514 by the trainer circuit 512 (block 1114). Instruction path data from data received in the instruction information 454 as a result of the instruction processing circuit 422 processing instructions 424F following the conditional branch instruction 424F is also updated in the branch state entries 508(1)-508(B) in the branch state table circuit 510 via the in-training branch hammock data 514 by the trainer circuit 512 (block 1114). The targets of branch instructions as a current instruction in the received instruction information 454 are also captured as potential convergence addresses (block 1114). The trainer circuit 512 determines if the path length (PL) in the path length entry 528 in the branch state entry 508(1)-508(B) in the branch state table circuit 510 for the in-training branch hammock is greater than a defined path length threshold, or if the current PC is equal to the PC of the conditional branch instruction 424F (BRPC), or if the number of captured branch targets as potential convergence addresses is greater than a defined target threshold (block 1116), the training for the in-training branch hammock will exit as having trained in one branch path (block 1118). In this example, the waiting confirmation indicator is set to a waiting state (block 1118). The captured branch targets are stored as potential convergence addresses in the branch state entry 508(1)-508(B) in the branch state table circuit 510 associated with the in-training branch hammock (block 1118). If the waiting confirmation indicator was previously set to a waiting state, the in-training branch hammock may fail (block 1118).

With continuing reference to FIG. 11, if trainer circuit 512 determines if the path length (PL) in the path length entry 528 in the branch state entry 508(1)-508(B) in the branch state table circuit 510 for the in-training branch hammock is not greater than a defined path length threshold, the current PC is not equal to the PC of the conditional branch instruction 424F (BRPC), and if the number of captured branch targets as potential convergence addresses is not greater than a defined target threshold (block 1116), the process repeats by the instruction information 454 for a next instruction 424F processed by the instruction processing circuit 422 being received (block 1110). If, in block 1112, the trainer circuit 512 determines if the in-training wait confirmation indicator is a wait confirmation state (block 1112), this means one path of the in-training branch hammock for a conditional branch instruction 424F has been trained and now the second path of the in-training branch hammock can be trained to determine if the in-training branch hammock is a branch DSH. In this regard, if the trainer circuit 512 determines the in-training wait confirmation indicator is a wait confirmation state (block 1112), a path length entry 528 in the branch state entry 508(1)-508(B) in the branch state table circuit 510 is updated via the in-training branch hammock data 514 by the trainer circuit 512 (block 1119). Instruction path data from data received in the instruction information 454 as a result of the instruction processing circuit 422 processing instructions 424F following the conditional branch instruction 424F is also updated in the branch state entries 508(1)-508(B) in the branch state table circuit 510 via the in-training branch hammock data 514 by the trainer circuit 512 (block 1119). The targets of branch instructions as a current instruction in the received instruction information 454 are also captured as potential convergence addresses (block 1119).

The trainer circuit 512 determines if the current PC is contained in the captured branch targets as potential convergence addresses (block 1120). If not, the process goes to block 1116 to process a next instruction 424F. If so, the training of the in-training branch hammock as a branch DSH is passed and confirmed (block 1122). The trainer circuit 512 may generate a branch hammock indicator 515 as part of the in-training branch hammock data 514 indicating the in-training branch hammock was not detected as an actual branch DSH (block 1122). The trained state in the trained entry 520 in the branch state entry 508(1)-508(B) in the branch state table circuit 510 for the in-training branch hammock is updated by the trainer circuit 512 to be increased and set to a trained state, meaning the conditional branch instruction 424F is confirmed as predicating a branch hammock (block 1122). The DSH entry 524 in the branch state entry 508(1)-508(B) in the branch state table circuit 510 for the in-training branch hammock is updated by the trainer circuit 512 to indicate that the conditional branch instruction 424F is confirmed as predicating a branch DSH (block 1122). In this example, the confidence in the confidence entry 534 in the branch state entry 508(1)-508(B) in the branch state table circuit 510 for the in-training branch hammock is updated by the trainer circuit 512 to be increased (block 1122). The count in the count entry 536 in the branch state entry 508(1)-508(B) in the branch state table circuit 510 for the in-training branch hammock is updated by the trainer circuit 512 to be increased (block 1122).

FIG. 12 is a block diagram of an exemplary processor-based system 1200 that includes a processor 1202 (e.g., a microprocessor) that includes an instruction processing circuit 1204. The processor-based system 1200 can be the processor-based system 400 in FIG. 4A, as an example. The instruction processing circuit 1204 can be the instruction processing circuit 422 in FIG. 4B that includes a branch hammock detection circuit 452 in FIGS. 4B and 5A and that can perform the branch hammock detection processes 600, 800, 1110 in FIGS. 6, 8, and 11, as examples. The processor-based system 1200 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 1200 includes the processor 1202. The processor 1202 represents one or more general-purpose processing circuits, such as a microprocessor, central processing unit, or the like. More particularly, the processor 1202 may be an EDGE instruction set microprocessor, or other processor implementing an instruction set that supports explicit consumer naming for communicating produced values resulting from execution of producer instructions. The processor 1202 is configured to execute processing logic in instructions for performing the operations and steps discussed herein. In this example, the processor 1202 includes an instruction cache 1208 for temporary, fast access memory storage of instructions accessible by the instruction processing circuit 1204. Fetched or prefetched instructions from a memory, such as from a main memory 1210 over a system bus 1212, are stored in the instruction cache 1208. The instruction processing circuit 1204 is configured to process instructions fetched into the instruction cache 1208 and process the instructions for execution. The processor 1202 can include a local cache memory 1214 to store cached data in the main memory 1210. Cache memory 1216 outside the processor 1202 between the local cache memory 1214 and the main memory 1210 can also be provided to provide a cache memory system 1218.

The processor 1202 and the main memory 1210 are coupled to the system bus 1212 and can intercouple peripheral devices included in the processor-based system 1200. As is well known, the processor 1202 communicates with these other devices by exchanging address, control, and data information over the system bus 1212. For example, the processor 1202 can communicate bus transaction requests to a memory controller 1219 in the main memory 1210 as an example of a slave device. Although not illustrated in FIG. 12, multiple system buses 1212 could be provided, wherein each system bus constitutes a different fabric. In this example, the memory controller 1219 is configured to provide memory access requests to a memory array 1220 in the main memory 1210. The memory array 1220 is comprised of an array of storage bit cells for storing data. The main memory 1210 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 1212. As illustrated in FIG. 12, these devices can include the main memory 1210, one or more input device(s) 1222, one or more output device(s) 1224, a modem 1226, and one or more display controllers 1228, as examples. The input device(s) 1222 can include any type of input device, including but not limited to input keys, switches, voice processors, etc. The output device(s) 1224 can include any type of output device, including but not limited to audio, video, other visual indicators, etc. The modem 1226 can be any device configured to allow exchange of data to and from a network 1230. The network 1230 can be any type of network, including but not limited to a wired or wireless network, a private or public network, a local area network (LAN), a wireless local area network (WLAN), a wide area network (WAN), a BLUETOOTH™ network, and the Internet. The modem 1226 can be configured to support any type of communications protocol desired. The processor 1202 may also be configured to access the display controller(s) 1228 over the system bus 1212 to control information sent to one or more displays 1232. The display(s) 1232 can include any type of display, including but not limited to a cathode ray tube (CRT), a liquid crystal display (LCD), a plasma display, etc.

The processor-based system 1200 in FIG. 12 may include a set of instructions 1234 to be executed by the processor 1202 for any application desired according to the instructions. The instructions 1234 may be stored in the main memory 1210, processor 1202, and/or instruction cache 1208 as examples of a non-transitory computer-readable medium 1236. The instructions 1234 may also reside, completely or at least partially, within the main memory 1210 and/or within the processor 1202 during their execution. The instructions 1234 may further be transmitted or received over the network 1230 via the modem 1226, such that the network 1230 includes computer-readable medium 1236.

While the computer-readable medium 1236 is shown in an exemplary embodiment to be a single medium, the term "computer-readable medium" should be taken to include a single medium or multiple media (e.g., a centralized or distributed database, and/or associated caches and servers)

that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A branch hammock detection circuit for detecting branch hammocks configured to:
   receive a conditional branch instruction record in an instruction stream being processed in a processor, the conditional branch instruction record comprising an instruction identifier of a conditional branch instruction in the instruction stream and a branch target address for the conditional branch instruction in the instruction stream;
   receive one or more instructions in the instruction stream processed by the processor following the conditional branch instruction in the instruction stream in a first branch instruction flow path of the conditional branch instruction;
   record at least one first branch target address of at least one first branch instruction processed by the processor in the first branch instruction flow path for an in-training branch hammock;
   receive a second conditional branch instruction record for the in-training branch hammock in the instruction stream, the second conditional branch instruction record comprising the instruction identifier of the conditional branch instruction and the branch target address for the conditional branch instruction;
   receive a second address of one or more second instructions in the instruction stream following the conditional branch instruction in a second branch instruction flow path of the conditional branch instruction that is not the first branch instruction flow path;
   record at least one second branch target address of at least one second branch instruction processed by the processor in the second branch instruction flow path for the in-training branch hammock;
   determine if the second address of the one or more second instructions following the conditional branch instruction in the second branch instruction flow path matches a branch target address among the recorded at least one first branch target address and the recorded at least one second branch target address; and
   in response to the second address matching the branch target address among the recorded at least one first branch target address and the recorded at least one second branch target address:
      generate a branch hammock indicator indicating the in-training branch hammock is an actual branch double-sided hammock (DSH) corresponding to the conditional branch instruction.

2. The branch hammock detection circuit of claim 1, further configured to allocate a branch state entry for the in-training branch hammock associated with the conditional branch instruction in a branch state table circuit comprising a plurality of branch state entries in response to receiving the conditional branch instruction record.

3. The branch hammock detection circuit of claim 2, wherein each branch state entry in the branch state table circuit comprises at least one path data entry; and
   the branch hammock detection circuit further configured to store instruction data produced by the processing of one or more instructions in a path data entry of the at least one path data entry in the branch state entry in the branch state table circuit associated with the in-training branch hammock.

4. The branch hammock detection circuit of claim 2, wherein each branch state entry in the branch state table circuit comprises a training path length entry; and
   the branch hammock detection circuit further configured to update a training path length for the in-training branch hammock in the training path length entry in the branch state entry in the branch state table circuit associated with the in-training branch hammock, in response to each instruction from the one or more instructions in the instruction stream processed by the processor following the conditional branch instruction in the instruction stream.

5. The branch hammock detection circuit of claim 4, further configured to determine if the training path length for the in-training branch hammock in an associated branch state entry in the branch state table circuit exceeds a defined path length threshold; and
   in response to the training path length for the in-training branch hammock exceeding the defined path length threshold before the second address matches branch target address among the recorded at least one first branch target address and the recorded at least one second branch target address:
      generate the branch hammock indicator indicating the in-training branch hammock as a failed branch DSH corresponding to the conditional branch instruction.

6. The branch hammock detection circuit of claim 2, wherein each branch state entry in the branch state table circuit comprises a confidence entry; and
   the branch hammock detection circuit further configured to increase a confidence state in the confidence entry for the in-training branch hammock in the confidence entry in the branch state entry in the branch state table circuit associated with the in-training branch hammock, in response to generating of the branch hammock indicator for the in-training branch hammock indicating the in-training branch hammock is the actual branch DSH.

7. The branch hammock detection circuit of claim 6, further configured to decrease the confidence state in the confidence entry for the in-training branch hammock in the branch state entry in the branch state table circuit associated with the in-training branch hammock, in response to generating of the branch hammock indicator for the in-training branch hammock indicating the in-training branch hammock as a failed branch DSH.

8. The branch hammock detection circuit of claim 1, further configured to, in response to the second address not matching the branch target address among the recorded at least one first branch target address and the recorded at least one second branch target address:
   determine if an address of an instruction of the one or more instructions following the conditional branch instruction matches the branch target address for the conditional branch instruction; and
   in response to determining the address of the instruction of the one or more instructions following the conditional branch instruction does not match the branch target address for the conditional branch instruction, the branch hammock detection circuit configured to:
   receive another second address of one or more instructions in the instruction stream processed by the processor following the conditional branch instruction in the instruction stream in the second branch instruction flow path;
determine if the other second address of the one or more second instructions following the conditional branch instruction in the second branch instruction flow path matches the branch target address among the recorded at least one first branch target address and the recorded at least one second branch target address; and
in response to the other second address matching the branch target address among the recorded at least one first branch target address and the recorded at least one second branch target address:
generate the branch hammock indicator indicating the in-training branch hammock is the actual branch DSH corresponding to the conditional branch instruction.

9. The branch hammock detection circuit of claim 8 further configured to:
in response to receiving the conditional branch instruction record:
set an in-training wait confirmation indicator to a wait confirmation state for the in-training branch hammock corresponding to the conditional branch instruction;
in response to receiving the second conditional branch instruction record:
set the in-training wait confirmation indicator to a no wait confirmation state for the in-training branch hammock; and
in response to the in-training wait confirmation indicator being the wait confirmation state, the branch hammock detection circuit configured to:
receive the second address of the one or more second instructions in the instruction stream following the conditional branch instruction in the instruction stream in the second branch instruction flow path;
record the at least one second branch target address of the at least one second branch instruction in the second branch instruction flow path for the in-training branch hammock;
determine if the second address of the one or more second instructions following the conditional branch instruction in the instruction stream in the second branch instruction flow path matches the branch target address among the recorded at least one first branch target address and the recorded at least one second branch target address; and
in response to the second address matching the branch target address among the recorded at least one first branch target address and the recorded at least one second branch target address, generate the branch hammock indicator indicating the in-training branch hammock is the actual branch DSH corresponding to the conditional branch instruction.

10. The branch hammock detection circuit of claim 1 further configured to:
in response to receiving the conditional branch instruction record:
set an in-training wait confirmation indicator to a wait confirmation state for the in-training branch hammock corresponding to the conditional branch instruction;
in response to receiving the second conditional branch instruction record:
set the in-training wait confirmation indicator to a no wait confirmation state for the in-training branch hammock; and
in response to the in-training wait confirmation indicator being the wait confirmation state, the branch hammock detection circuit configured to:
receive the second address of the one or more second instructions in the instruction stream following the conditional branch instruction in the instruction stream in the second branch instruction flow path;
record the at least one second branch target address of the at least one second branch instruction in the second branch instruction flow path for the in-training branch hammock;
determine if the second address of the one or more second instructions following the conditional branch instruction in the instruction stream in the second branch instruction flow path matches the branch target address among the recorded at least one first branch target address and the recorded at least one second branch target address; and
in response to the second address matching the branch target address among the recorded at least one first branch target address and the recorded at least one second branch target address:
generate the branch hammock indicator indicating the in-training branch hammock is the actual branch DSH corresponding to the conditional branch instruction.

11. A method of detecting a branch hammock predicated by a conditional branch instruction in an instruction stream executing in a processor, comprising:
receiving a conditional branch instruction record in an instruction stream being processed in a processor, the conditional branch instruction record comprising an instruction identifier of a conditional branch instruction in the instruction stream and a branch target address for the conditional branch instruction in the instruction stream;
receiving one or more instructions in the instruction stream processed by the processor following the conditional branch instruction in the instruction stream in a first branch instruction flow path of the conditional branch instruction;
recording at least one first branch target address of at least one first branch instruction processed by the processor in the first branch instruction flow path for an in-training branch hammock;
receiving a second conditional branch instruction record for the in-training branch hammock in the instruction stream, the second conditional branch instruction record comprising the instruction identifier of the conditional branch instruction and the branch target address for the conditional branch instruction;
receiving a second address of one or more second instructions in the instruction stream following the conditional branch instruction in a second branch instruction flow path of the conditional branch instruction that is not the first branch instruction flow path;
recording at least one second branch target address of at least one second branch instruction processed by the processor in the second branch instruction flow path for the in-training branch hammock;
determining if the second address of the one or more second instructions following the conditional branch instruction in the second branch instruction flow path matches a branch target address among the recorded at least one first branch target address and the recorded at least one second branch target address; and in response to the second address matching the branch target address among the recorded at least one first branch target address and the recorded at least one second branch target address, generating a branch hammock indicator indicating the in-training branch hammock is an actual branch double-sided hammock (DSH) corresponding to the conditional branch instruction.

12. The method of claim 11, further comprising allocating a branch state entry for the in-training branch hammock associated with the conditional branch instruction in a branch state table circuit comprising a plurality of branch state entries in response to receiving the conditional branch instruction record.

13. The method of claim 12, wherein each branch state entry in the branch state table circuit comprises at least one path data entry; and further comprising storing instruction data produced by the processing of one or more instructions in a path data entry of the at least one path data entry in the branch state entry in the branch state table circuit associated with the in-training branch hammock.

14. The method of claim 12, wherein each branch state entry in the branch state table circuit comprises a training path length entry; and further comprising updating a training path length for the in-training branch hammock in the training path length entry in the branch state entry in the branch state table circuit associated with the in-training branch hammock, in response to each instruction from the one or more instructions in the instruction stream processed by the processor following the conditional branch instruction in the instruction stream.

15. The method of claim 14, further comprising determining if the training path length for the in-training branch hammock in an associated branch state entry in the branch state table circuit exceeds a defined path length threshold; and in response to the training path length for the in-training branch hammock exceeding the defined path length threshold before the second address matches branch target address among the recorded at least one first branch target address and the recorded at least one second branch target address:
generating the branch hammock indicator indicating the in-training branch hammock as a failed branch DSH corresponding to the conditional branch instruction.

16. The method of claim 12, wherein each branch state entry in the branch state table circuit comprises a confidence entry; and further comprising increasing a confidence state in the confidence entry for the in-training branch hammock in the confidence entry in the branch state entry in the branch state table circuit associated with the in-training branch hammock, in response to generating of the branch hammock indicator for the in-training branch hammock indicating the in-training branch hammock is the actual branch DSH.

17. The method of claim 16, further comprising decreasing the confidence state in the confidence entry for the in-training branch hammock in the training path length entry in the branch state entry in the branch state table circuit associated with the in-training branch hammock, in response to generating of the branch hammock indicator for the in-training branch hammock indicating the in-training branch hammock as a failed branch DSH.

18. The method of claim 11, further comprising, in response to the second address not matching the branch target address among the recorded at least one first branch target address and the recorded at least one second branch target address:
determining if an address of the instruction of the one or more instructions following the conditional branch instruction matches the branch target address of the conditional branch instruction; and
in response to determining the address of an instruction of the one or more instructions following the conditional branch instruction does not match the branch target address of the conditional branch instruction, comprising:
receiving another second address of one or more instructions in the instruction stream processed by the processor following the conditional branch instruction in the instruction stream in the second branch instruction flow path;
determining if the other second address of the one or more second instructions following the conditional branch instruction in the second branch instruction flow path matches the branch target address among the recorded at least one first branch target address and the recorded at least one second branch target address and
in response to the other second address matching the branch target address among the recorded at least one first branch target address and the recorded at least one second branch target address:
generating the branch hammock indicator indicating the in-training branch hammock is the actual branch DSH corresponding to the conditional branch instruction.

19. The method of claim 11, further comprising:
in response to receiving the conditional branch instruction record:
setting an in-training wait confirmation indicator to a wait confirmation state for the in-training branch hammock corresponding to the conditional branch instruction;
in response to receiving the second conditional branch instruction record:
setting the in-training wait confirmation indicator to a no wait confirmation state for the in-training branch hammock; and
in response to the in-training wait confirmation indicator being the wait confirmation state, comprising:
receiving the second address of the one or more second instructions in the instruction stream following the conditional branch instruction in the instruction stream in the second branch instruction flow path;
recording the at least one second branch target address of the at least one second branch instruction in the second branch instruction flow path for the in-training branch hammock;
determining if the second address of the one or more second instructions following the conditional branch instruction in the instruction stream in the second branch instruction flow path matches the branch target address among the recorded at least one first branch target address and the recorded at least one second branch target address; and
in response to the second address matching the branch target address among the recorded at least one first branch target address and the recorded at least one second branch target address:

generating the branch hammock indicator indicating the in-training branch hammock is the actual branch DSH corresponding to the conditional branch instruction.

* * * * *